United States Patent [19]
Tossel et al.

[11] Patent Number: 5,978,499
[45] Date of Patent: *Nov. 2, 1999

[54] APPARATUS AND METHOD FOR INSPECTING BOX BLANKS

[75] Inventors: Yvan L. Tossel, Nashua; Alfred L. Girard, Amherst, both of N.H.

[73] Assignee: International Paper Box Machine Company, Inc., Nashua, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,256

[22] Filed: Jun. 5, 1996

[51] Int. Cl.⁶ .............................. G06K 9/00; B31B 1/00
[52] U.S. Cl. ........................... 382/141; 382/143; 493/12; 493/37; 348/125
[58] Field of Search ...................................... 382/100, 141, 382/143, 111–112; 348/88, 91, 92, 125–128; 493/12, 16, 37

[56] References Cited

U.S. PATENT DOCUMENTS

| | | |
|---|---|---|
| 4,539,002 | 9/1985 | Zak ............................................ 493/35 |
| 4,607,252 | 8/1986 | Neri .......................................... 493/37 |
| 4,704,034 | 11/1987 | Takenaka et al. ...................... 356/429 |
| 4,972,494 | 11/1990 | White et al. ................................ 382/8 |
| 4,995,091 | 2/1991 | Shimbara .................................... 382/50 |
| 5,007,096 | 4/1991 | Yoshida ...................................... 382/8 |
| 5,046,111 | 9/1991 | Cox et al. ............................... 382/143 |
| 5,077,806 | 12/1991 | Peters et al. ................................ 382/8 |
| 5,212,656 | 5/1993 | Clary et al. ............................. 364/552 |
| 5,230,686 | 7/1993 | McAdam, III et al. ................. 493/29 |
| 5,274,713 | 12/1993 | Chang et al. ............................... 382/8 |
| 5,311,599 | 5/1994 | Preischlad ................................... 382/8 |
| 5,342,278 | 8/1994 | Kurandt .................................... 493/37 |
| 5,664,026 | 9/1997 | Neri et al. ............................... 382/143 |

*Primary Examiner*—Leo H. Boudreau
*Assistant Examiner*—Bhavesh Mehta
*Attorney, Agent, or Firm*—Pearson & Pearson

[57] ABSTRACT

An apparatus and method for inspecting skived glue, hemming and skew, and backfold of cartons by means of real time image comparison. The apparatus comprises channel sensors, means for measuring conveyor travel distance, a system controller coupled to the channel sensors, a memory for storing images, a processor coupled to the outputs of the system controller and the memory and a bad carton locator means. A known good carton is passed through the channel sensors and a reference synthetic image is stored in a memory. A test carton is passed through the channel sensors producing a real time image which is compared to the stored reference synthetic image for detecting defects.

30 Claims, 23 Drawing Sheets

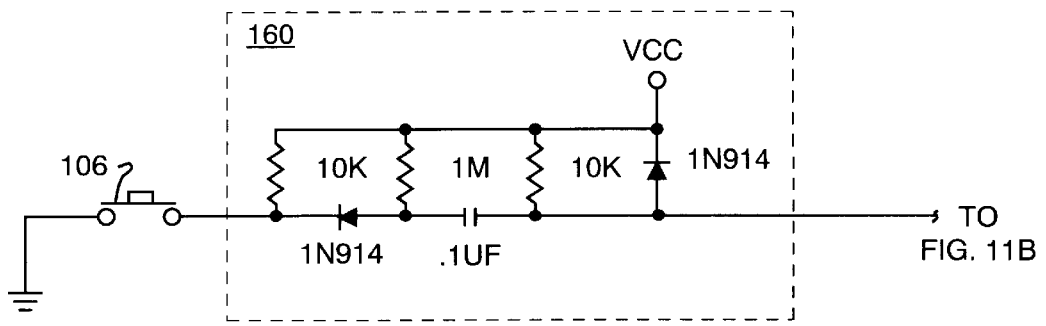
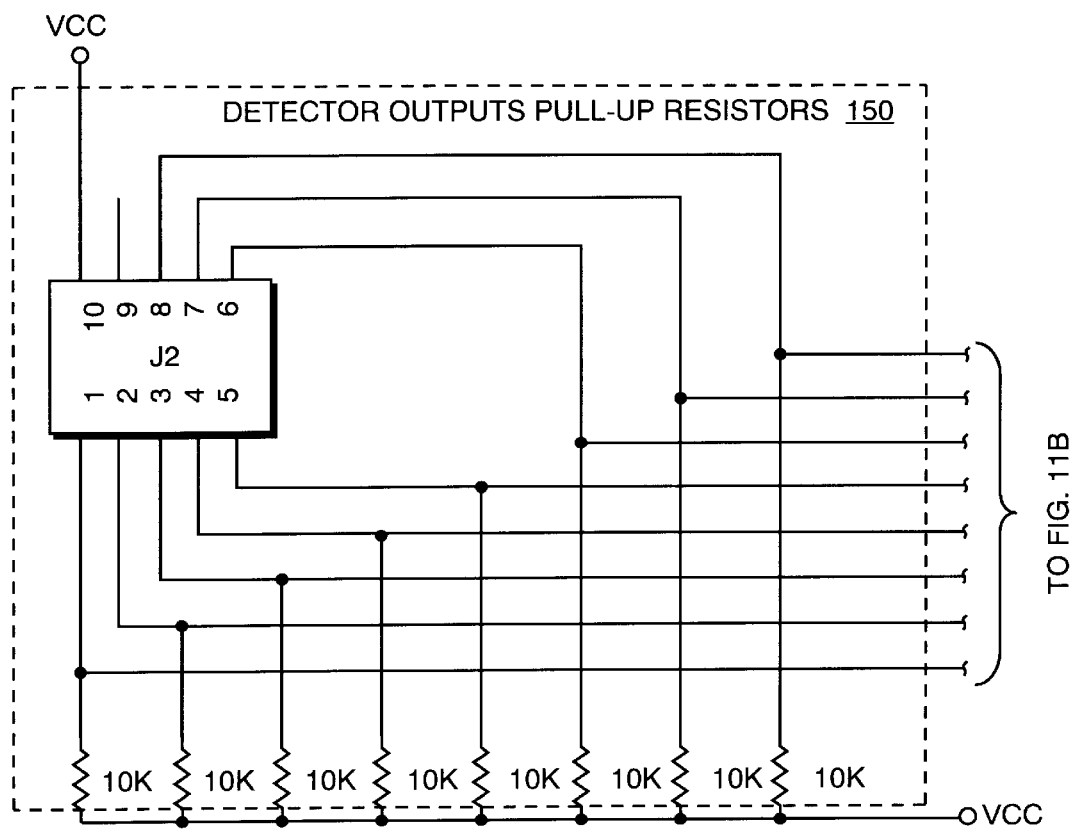
FIG. 11A

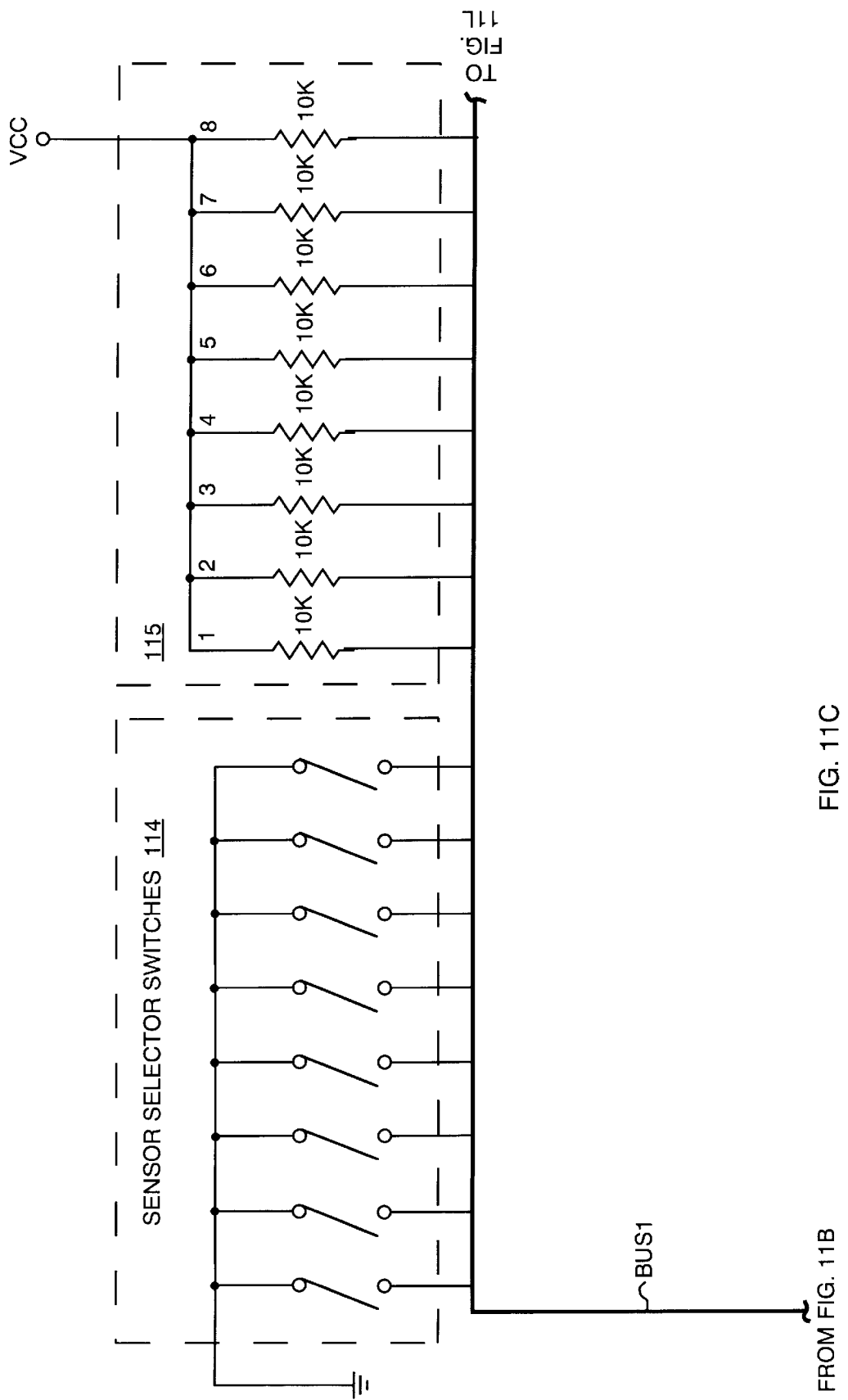

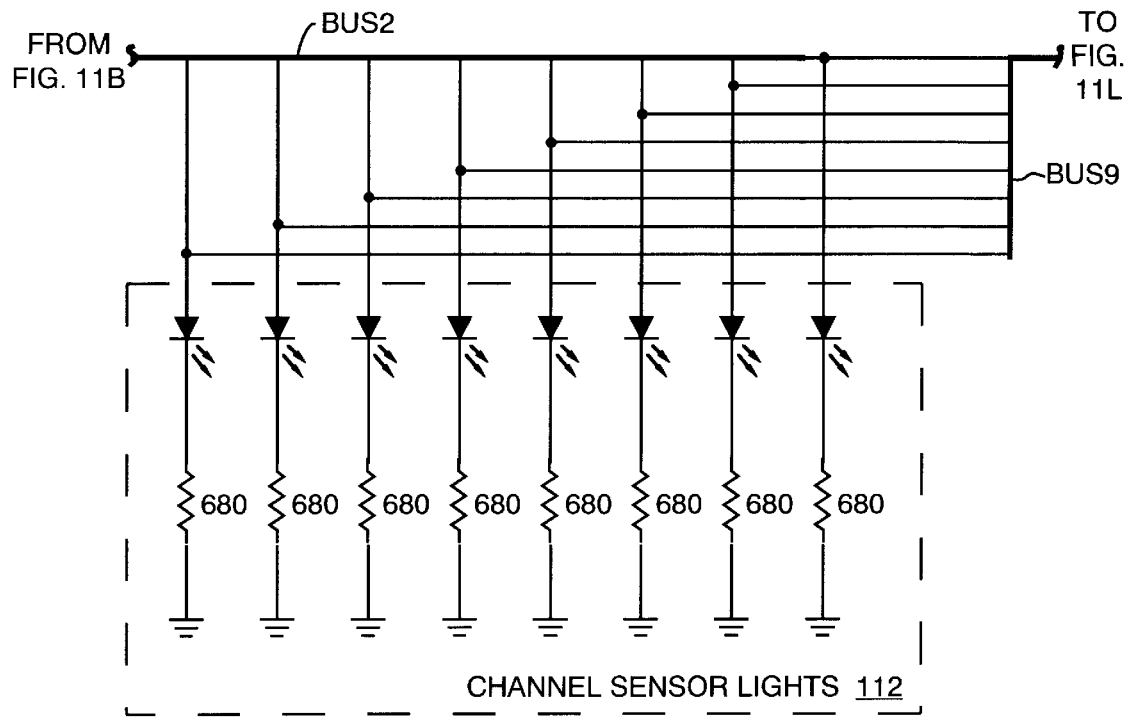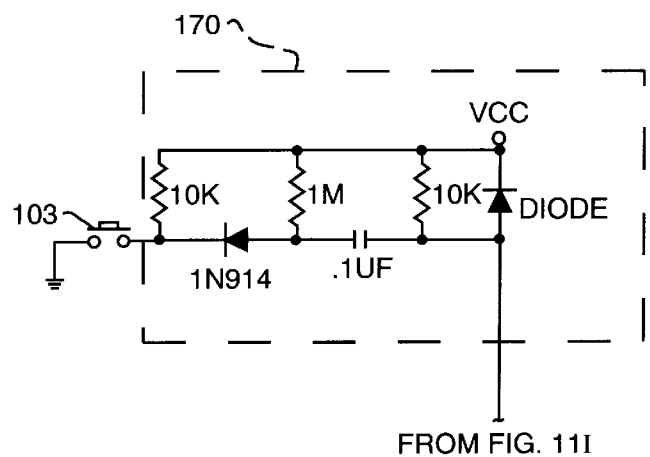
FIG. 11K

APPARATUS AND METHOD FOR INSPECTING BOX BLANKS

BACKGROUND OF THE INVENTION

1. Field of the Invention

This invention relates generally to the field of paper box folding and sealing and more specifically to an apparatus and method for inspecting carton blanks moving along an assembly line using a real time synthetic image processing system for inspecting skived glue, hemming and skew, and backfold of cartons.

2. Description of Related Art

During the manufacture of paper boxes, paper blanks advance along a paper line pathway for diverse folding and gluing or sealing operations. The paper blanks may have "score lines" that divide the blank into sections called "panels" and "flaps". During folding operations, the sections are folded about the score lines to produce the sides, top and bottom of a completed box. In one such folding and gluing operation, a portion of the edge flap thickness is cut away and then folded back on itself. It is then folded into a partially overlapping relationship over central, adjoining panels of a blank along certain score lines. The flaps and panels of the blank are glued or otherwise sealed to produce a completed structure in the form of a folded box. After a paper box has been assembled, a sample of such boxes is tested for defects by observation or by testing in a dark room by shining a light and looking for light passages in the box. These methods are time consuming and do not include 100% testing.

Various video inspection systems are known in the prior art. A box inspection device and method is described in U.S. Pat. No. 5,213,656, issued May 15, 1993, to Michael W. Chang et al. and assigned to Prime Technology, Inc. This patent discloses a box inspection device and method. A quality monitoring system employing vision processing equipment to photograph at least one of the edges of every folded-over box blank as it is conveyed through a box forming machine is used to determine in-line whether the blanks, when unfolded, will produce square boxes having essentially all angles between adjacent box side panels. The electronic images are electronically digitized and the resulting data processed by computer to calculate critical parameters of the folded-over blank, including gap width, longitudinal taper of the gap width, and alignment of the lateral edges of the panels surrounding the gap in relation to the lateral edge of the gap. Comparison of these measured critical parameters with corresponding parameters for an idealized box stored in the computer indicates the quality of the formed box and whether the quality falls within acceptable parameters. However, a video means is used to obtain a picture of a box blank which is then digitized and analyzed. The primary disadvantage of this approach is speed of data acquisition and analysis. At typical line speeds of 2000 belt feet/minute, between 33 to 67 boxes per second would have to be inspected.

U.S. Pat. No. 4,995,091, issued on Feb. 19, 1991, to Hoshimi Shimbara, and assigned to Mazda Motor Manufacturing (USA) Company describes a method and apparatus for identifying marking holes in an object moving along a conveyor or the like, in which television image signals of the identifying marking holes are classified into signals above and below a threshold level voltage and then made into a monochrome image of the identifying marking holes which is then compared with a pre-memorized image of the marking hole. However, this apparatus also cannot operate at the above indicated line speeds.

SUMMARY

Accordingly, it is therefore an object of the invention to provide paper box folding and sealing machinery with an inspection capability for identifying defects in carton blanks.

It is another object of the invention to provide a paper box folding and sealing apparatus with an inspection system that detects defects in carton blanks and ejects a defective carton blank.

It is another object of the invention to provide 100% inspection of cartons on a conveyor belt by means of real time image comparison.

It is another object of this invention to inspect cartons for defects in skiving, hemming and skew and backfolding.

It is a further object of this invention to acquire and store an image of a carton blank without defects and to compare the stored image to a real time image of a test carton blank in order to identify a defect.

The objects are further accomplished by providing an apparatus in an inspection zone of a paper box folding machine for forming individually and successively planar carton blanks into folded cartons, the machine including conveyor means for transporting successively spaced blanks along a paper line axis, the apparatus comprising means for sensing carton blanks moving on the conveyor means, means coupled to the sensing means for sampling the outputs of the sensing means in synchronism with a timing pulse, the sampled outputs forming an image of the carton blanks, means coupled to the sensing means for controlling the transfer of the outputs of the sensing means, means coupled to the controlling means for storing the sensing means outputs forming the image of the carton blanks, and means coupled to the controlling means and the storing means for processing the outputs of the sensing means by comparing the outputs representing real time image data to previously stored outputs representing image data of a good carton blank to detect any defects in the one of the carton blanks providing the real time image data. The sensing means comprises an array of infrared transmitters positioned opposite infrared receivers. The sampling of the outputs of the sensing means in synchronism with the timing pulse is performed at a rate proportional to the speed of the conveyor means, each timing pulse representing a single increment of distance travelled by the conveyor means. The conveyor means travel distance measurement enables the acquisition of the image data proportional to the actual size of carton blanks measured, independent of the conveyor means speed. The apparatus comprises a line tachometer means for providing the timing pulse. The storing means comprises a static or dynamic random access memory. An alternate embodiment of the sensing means comprises a plurality of sensors arranged along the direction of travel of the conveyor means, means for measuring the distance traveled by the conveyor means, and means coupled to each of the plurality of sensors for equalizing in time outputs from the sensing means. The objects are further accomplished by providing an apparatus having an inspection zone in a paper box folding machine for forming individually and successively planar carton blanks into folded cartons, the machine including conveyor means for transporting successively spaced blanks along a paper line axis, the machine apparatus having an inspection zone with apparatus comprising means for sensing carton blanks moving on the conveyor means, means coupled to the sensing means for sampling the outputs of the sensing means in synchronism with a timing pulse, the sampled outputs forming an image of the carton blanks, means coupled to the sensing means for controlling the transfer of the outputs of the sensing means, means coupled to the controlling means for storing the sensing means outputs forming the image of the carton blanks, means coupled to the controlling means and the storing means for processing the outputs of the sensing means by comparing the outputs representing real time image data to previously stored outputs representing image data of a good carton blank to detect any defects in the one of the carton blanks providing the real time image data, and means coupled to the controlling means for generating a signal to stop the feeding of the carton blanks into the machine when a bad carton blank is detected by the processing means. The sensing means comprises an array of infrared transmitters positioned opposite infrared receivers. The sampling of the outputs of the sensing means in synchronism with the timing pulse is performed at a rate proportional to the speed of the conveyor means, each timing pulse representing a single increment of distance travelled by the conveyor means. The conveyor means travel distance measurement enables the acquisition of the image data proportional to the actual size of the carton blanks measured, independent of the conveyor means speed. The apparatus comprises a line tachometer means for providing the timing pulse. The storing means comprises a static or dynamic random access memory. The controlling means comprises means for identifying the bad carton blanks following the stopping of the carton blank feed. The apparatus comprises a control and display panel for displaying an identifying number for each bad carton blank following the stopping of the carton blank feed.

The objects are further accomplished by providing an apparatus for detecting defects in a carton blank moving on a conveyor comprising infrared means for sensing a carton blank moving on the conveyor, means coupled to the infrared sensing means for sampling the outputs of the sensing means in synchronism with a timing pulse at a rate proportional to the speed of the conveyor to form an image of the carton blank, means coupled to the infrared sensing means for controlling the transfer of the outputs of the infrared sensing means, means coupled to the controlling means for storing the sampled outputs of the infrared sensing means, means coupled to the controlling means and the memory means for processing real time image data of the carton blank and comparing the real time image data to previously stored image data of a good carton blank to detect any defects in the carton blank being tested, means coupled to the controlling means for generating a signal to stop the feeding of carton blanks into the apparatus when a bad carton blank is detected by the processing means, and means coupled to the controlling means for identifying the bad carton blanks following the stopping of the carton feed. The apparatus comprises a line tachometer means for providing the timing pulse. The apparatus also comprises a control end display panel for displaying an identifying number for each bad carton blank following the stopping of the carton blank feed.

The objects are further accomplished by providing a method for inspecting box blanks in a paper box folding machine for forming individually and successively planar box blanks into folded boxes, the machine including conveyor means for transporting successively spaced blanks along a paper line axis, comprising the steps of sensing box blanks moving on the conveyor means, sampling the outputs of the sensing means in synchronism with a timing pulse, the sampled outputs forming an image of the box blanks, controlling the transfer of the outputs of the sensing means, storing the sensing means outputs forming the image of the box blanks with means coupled to the controlling means, and processing the outputs of the sensing means by comparing the outputs representing real time image data to previously stored outputs representing image data of a good box blank to detect any defects in the one of the box blanks providing the real time image data with means coupled to the controlling means and the storing means. The step of sampling of the outputs of the sensing means comprises the step of performing the sampling in synchronism with the timing pulse at a rate proportional to the speed of the conveyor means, each timing pulse representing a single increment of distance travelled by the conveyor means. The method further comprises the step of generating a signal to stop the feeding of the box blanks with the machine when a bad box blank is detected by the processing means. The method comprises the step of displaying an identifying number for each bad box blank following the stopping of the bad box feed.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 11A to 11L combined are schematic block diagrams of the synthetic image processing inspection apparatus shown in FIG. 2.

DESCRIPTION OF PREFERRED EMBODIMENTS

Figure 1:
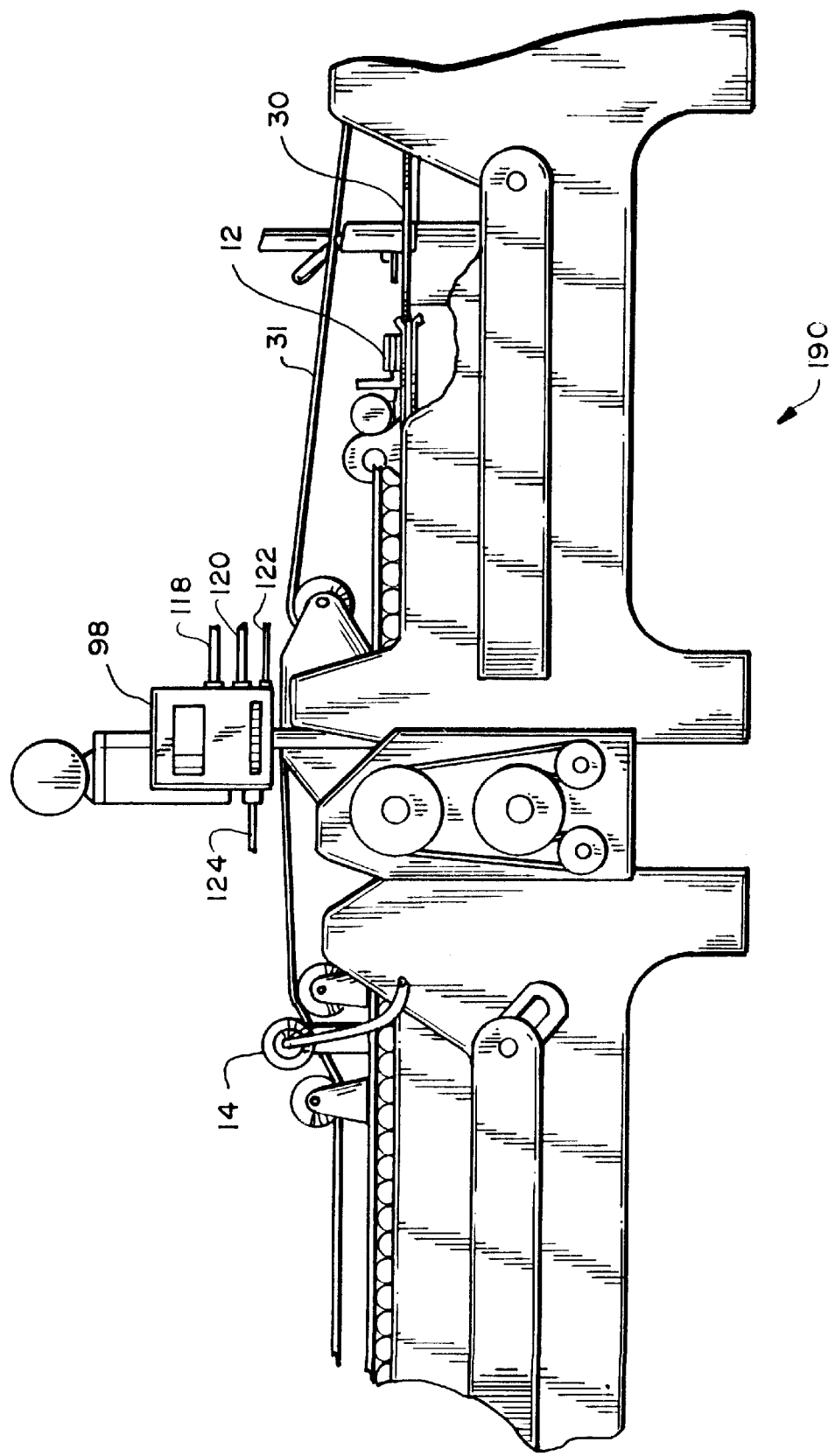
FIG. 1 is a side elevational view of a portion of a paper box folding and sealing machine for forming boxes having incorporated therein an apparatus for inspecting box blanks showing the positioning of an array sensor 12, a control panel 98 and a line tachometer 14.

Referring to FIG. 1, a side elevational view of a paper box folding and sealing machine 100 having incorporated therein synthetic image inspection apparatus 10 for inspecting box or carton blanks. The apparatus 10 comprises an 8-channel sensor 12, a line tachometer 14 and electronics mounted in a control panel 98. The portion of the paper box folding and sealing machine 100 shown in FIG. 1 is referred to as the skiving action. A box blank 30 enters from the right side of the machine 100 and travels to the left along a conveyor 29. The terms box and carton are used interchangeably when referring to the paper box blanks 30 being processed by the folding and sealing machine 100.

Figure 2:
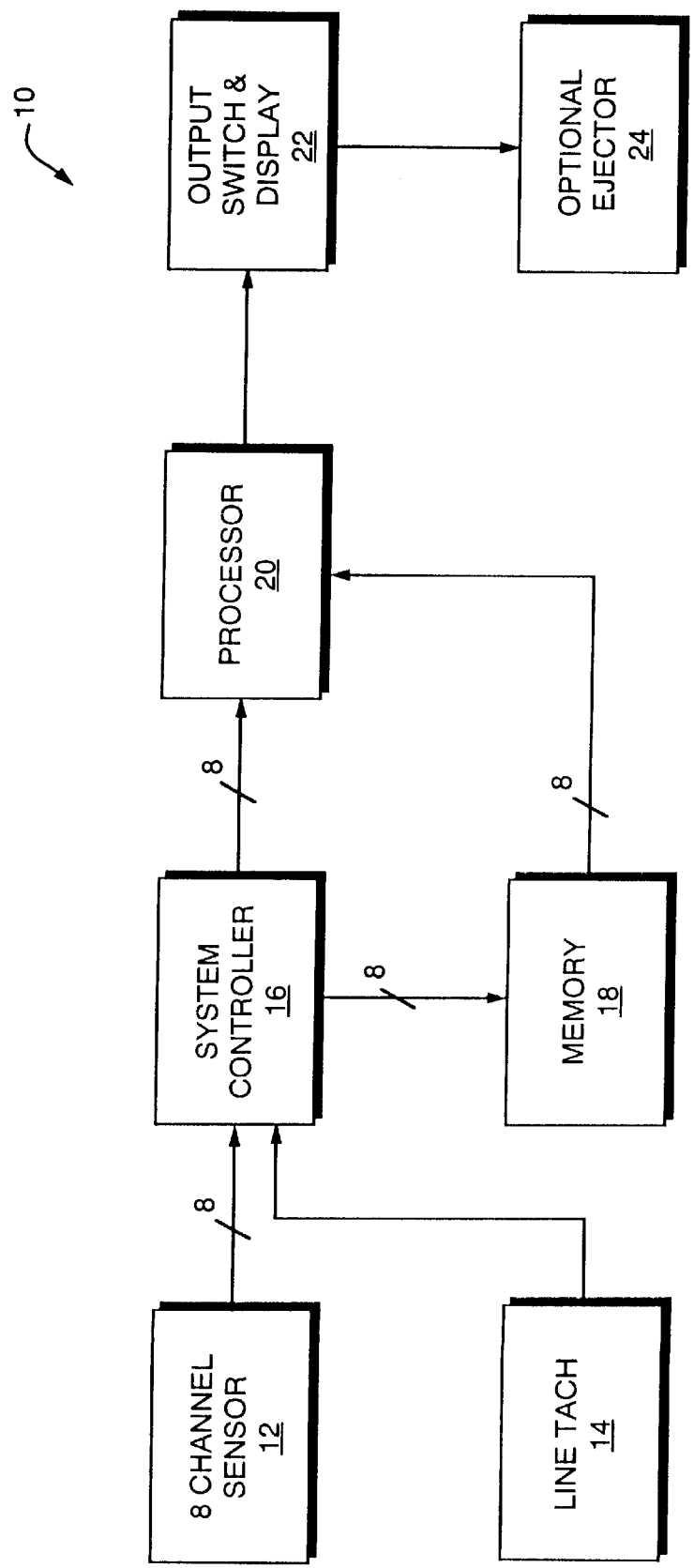
FIG. 2 is a systems block diagram of a synthetic image inspection apparatus for inspecting box blanks in accordance with the present invention.

Referring now to FIG. 2, a functional block diagram is shown of the invention comprising an apparatus 10 for inspecting box or carton blanks. The synthetic image processing inspection apparatus 10 provides real time inspection of cartons on a conveyor 29 inspecting skived glue flap, hemming and skew and backfold. The inspection system 10 comprises the 8-channel array sensor 12 and the line tachometer 14 which provide data to a system controller 16. The system controller 16 feeds data received from the 8 channel sensor sampled in synchronization with a timing pulse provided by the line tachometer 14 to a memory 18 or to a processor 20. The processor 20 also receives data from the memory 18 and the outputs from the processor 20 are fed to an output switch and display 22 which indicates errors and locates bad carton blanks. An optional ejector 24 removes a located bad carton from the conveyor 29.

Figure 3:
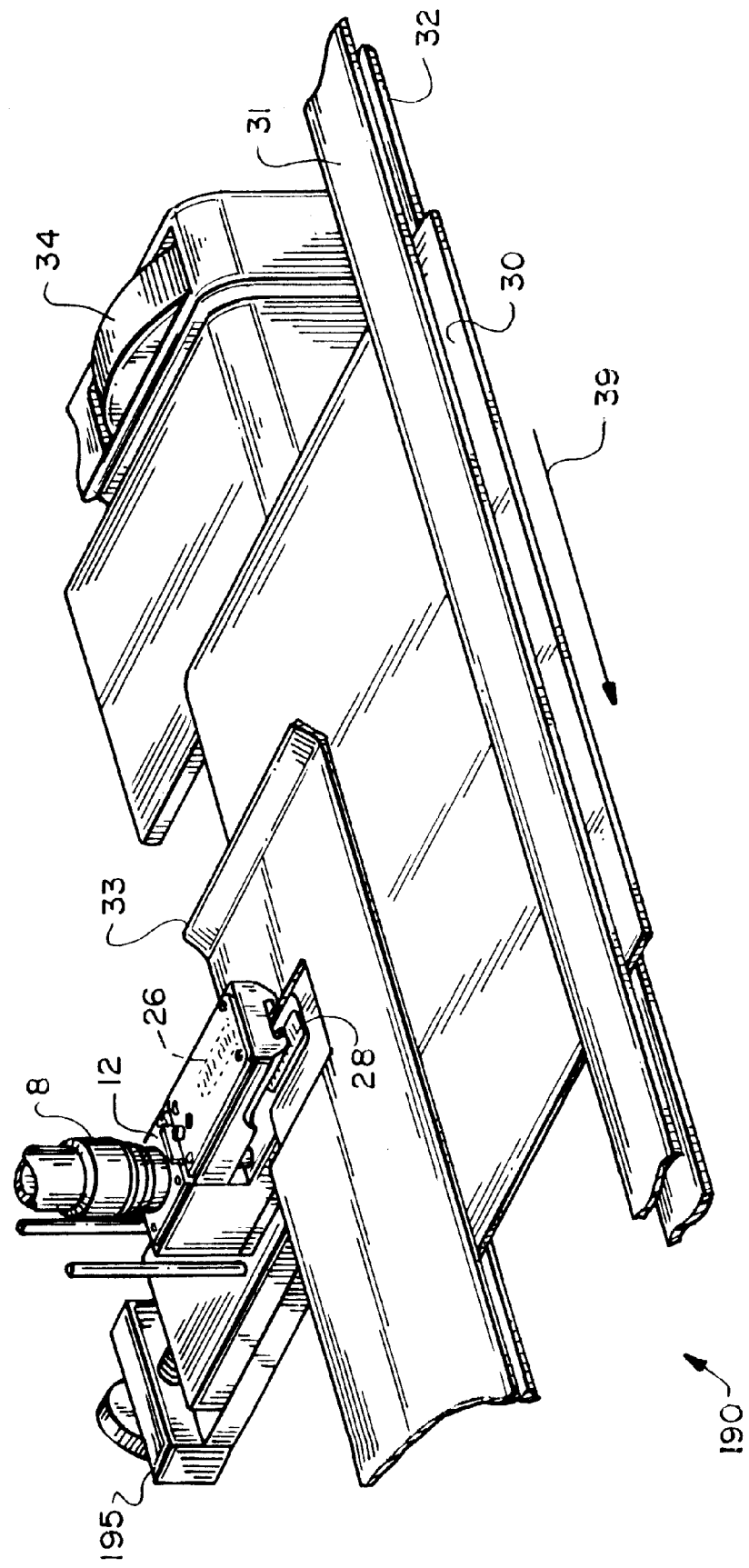
FIG. 3 is a perspective view of a skiving section of a paper box folding and sealing machine showing an 8-channel sensor 12 mounted over a conveyor carrying paper box blanks which are guided through the sensor in the direction indicated.

Referring now to FIG. 2 and FIG. 3, FIG. 3 is a perspective view of a skiving section of a paper box folding and sealing machine 100 showing the 8-channel sensor 12 mounted over a conveyor 29 carrying paper box blanks 30 which are guided by an alignment guide 33 through the sensor 12 in the direction indicated. The 8 channel sensor 12 comprises infrared transmitters 28 and infrared receivers 26 located opposite each other. If a signal from the IR transmitters 28 reaches the IR receivers 26, a hole or empty location has been detected in the box blank which causes a logic zero to be written to the channel in which it occurs. Similarly, if the signal does not reach the receiver, a logic one is written. Since each sample is synchronized in distance by the line tachometer 14, a set of segmented samples builds an image.

Figure 4:
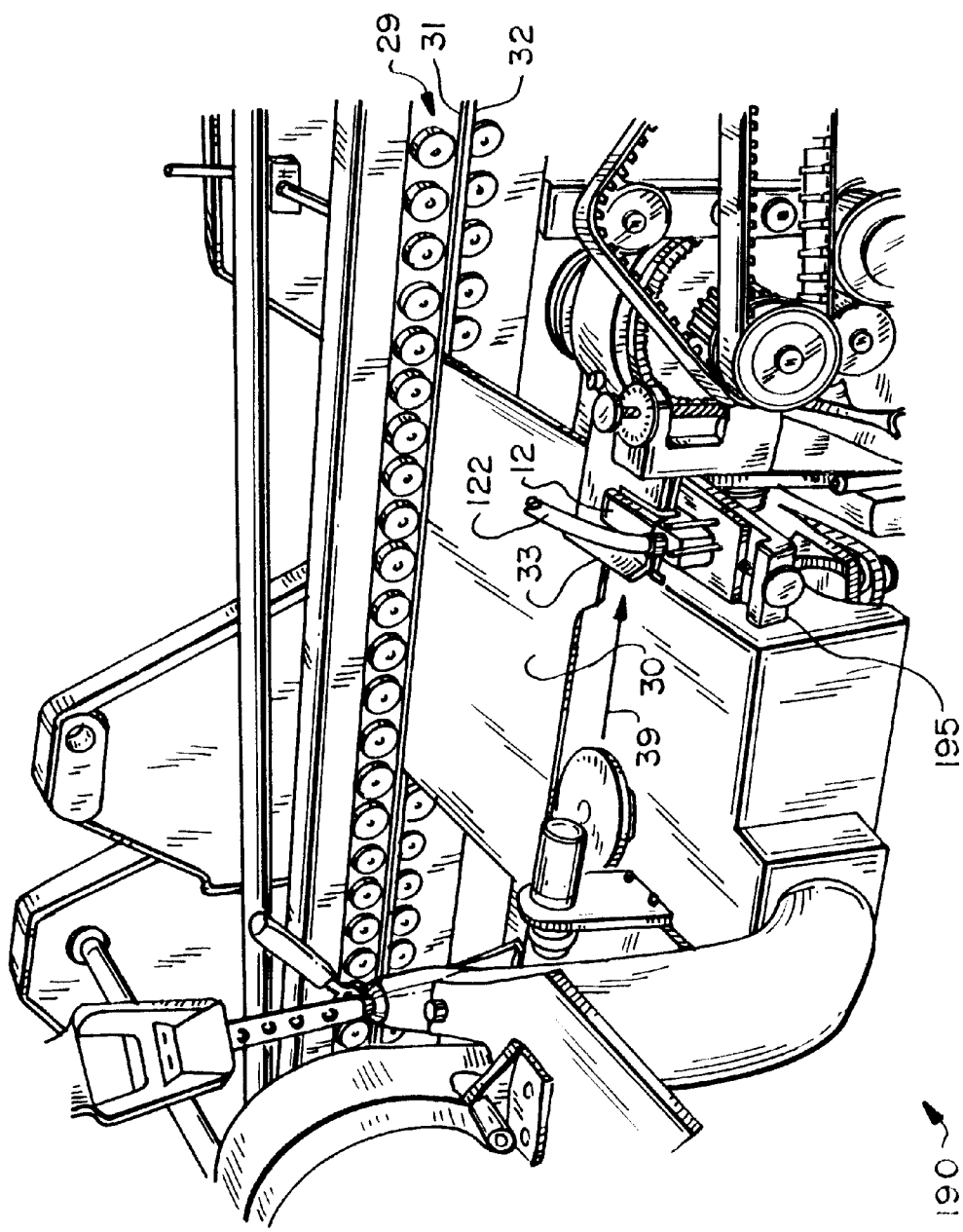
FIG. 4 is a perspective view from the rear of the skiving section of a paper box folding and sealing machine showing the 8-channel sensor 12 attached with a sensor mounting clamp 195 and a box blank 30 moving along a conveyor, driven by upper 31 and lower 32 belts, being guided through the sensor in the direction indicated.

Referring now to FIG. 4, a perspective view from the rear is shown of the skiving section of the paper box folding a sealing machine 190 showing the 8-channel sensor 12 attached to the machine 190 with a sensor mounting clamp 195. The box blank 30 moves along the conveyor 29 driven by an upper belt 31 and a lower belt 32. The box blank 30 is guided into the sensor 12 by alignment guide 33. A cable 122 provides the signals from the 8-channel sensor 12 to the control panel 98.

Figure 5:
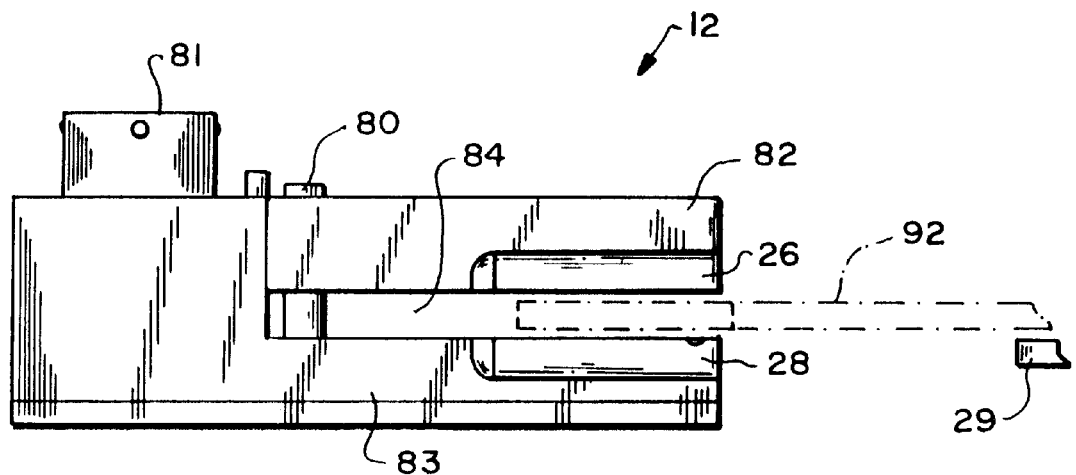
FIG. 5 is a side elevational view of the array sensor showing an upper adjustment arm set for a wide paper box blank 92.
Figure 6:
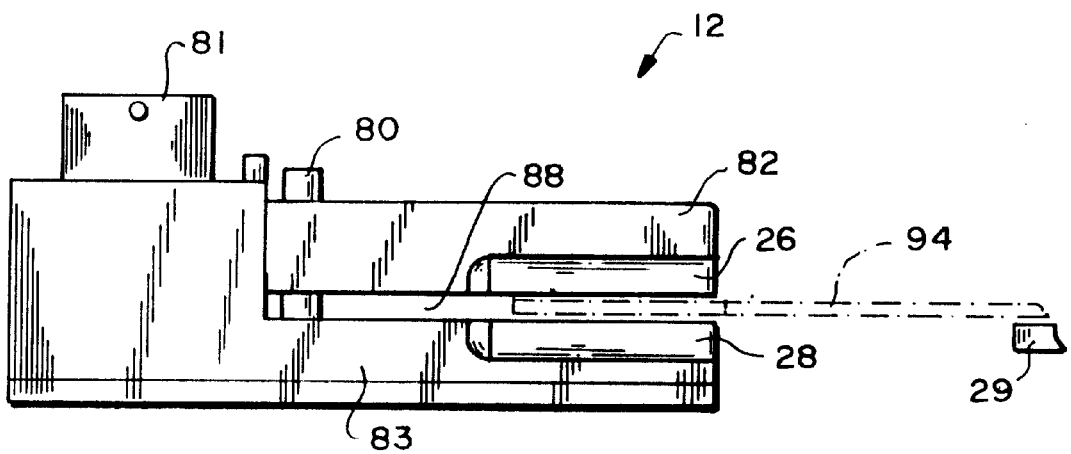
FIG. 6 is a side elevational view of the array sensor showing an upper adjustment arm set for a narrow paper box blank 94.

Referring to FIG. 5 and FIG. 6, FIG. 5 shows a side elevation view of the 8-channel sensor 12 having an adjustable upper arm 82 for handling variations in the thickness of paper box blanks 92 passing through the sensor 12. An adjustment pin 80 adjusts the position of the upper arm 82 relative to the lower 83 portion of the sensor 12. The transmitters 28 are located in the lower portion 83 and the receivers 26 are located opposite the transmitter 28 in the upper 82 arm portion. FIG. 5 shows the upper arm 82 adjusted to its highest position providing the widest gap 84.

FIG. 6 shows the upper arm 82 adjusted to a lower position providing a smaller gap 88 for inspecting a thinner box blank 94. The 8-channel sensor 12 may be embodied by Part No. 20029473 manufactured by International Paper Box Machine Company, Inc. of Nashua, N.H.

Figure 7:
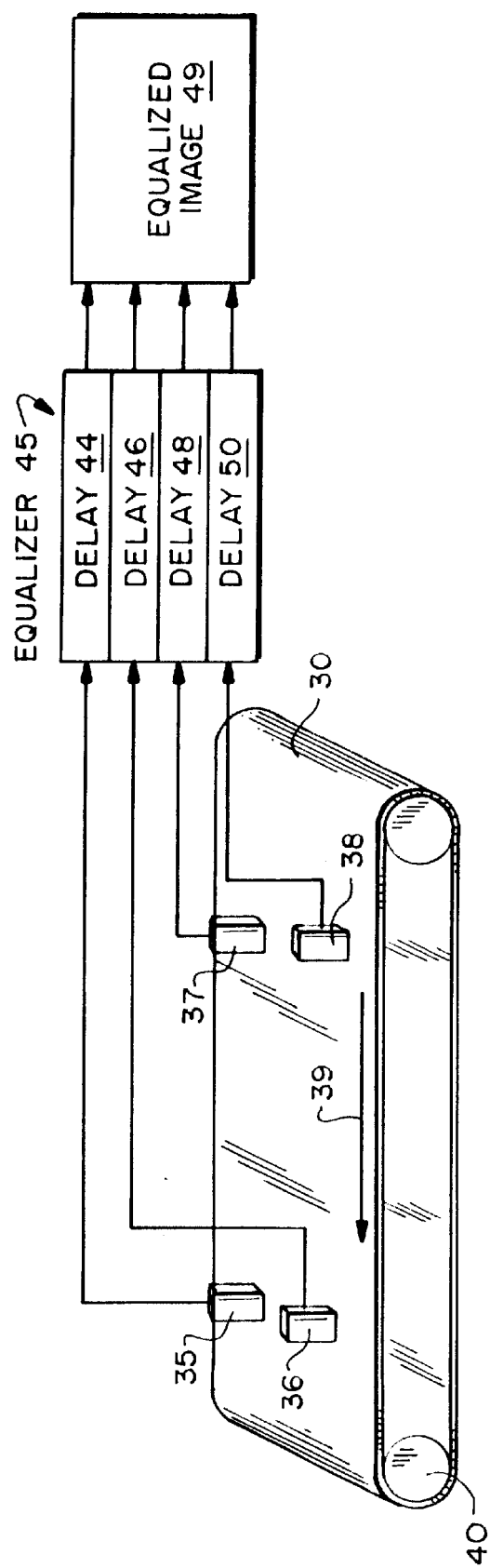
FIG. 7 is an illustration of an alternate embodiment of multiple independent sensors coupled to an equalizer delay network.

Referring now to FIG. 7, an alternate embodiment of a sensor network is shown comprising four sensors 35, 36, 37 and 38 arranged in two pairs transverse to the direction of travel of the conveyor 29 having cartons 30 thereon. The outputs from sensors 35 to 38 are fed to an equalizer 45 comprising four delay units 46, 47 and 48 which produce an equalized image. The equalizer 42 enables all the sensors 32, 34, 36 and 38 measurements to be outputted at the same time. The delay units 46 to 49 may be embodied by shift registers, known to one of ordinary skill in the art, which may be designed into a custom Electronically Programmable Logic Device (EPLD) such as the 7000 Series or 9000 Series devices manufactured by Altera Corporation, San Jose, Calif.

Still referring to FIG. 7, an input, Clock_In, may be driven from the line tach 14 on the machine 190, and generates a pulse each predetermined increment of distance traveled by the machine's conveyer 29, e.g. one pulse per millimeter of belt travel. The input, Pulse_In, is the signal of equivalent pulse width of one or more increments to be delayed. Using D-type flip-flops for each delay unit 45 to 48, the flip-flop represents one increment of belt travel, so a pulse input to the first flip-flop in the chain will emerge at the output, Q, of the fourth flip-flop delayed by four increments of belt travel. A logic ONE at the input of any one of the delay units 46 to 64, while all of the others are at logic ZERO, will route the output of an associated AND gate (not shown) to the output of the circuit, Delayed Pulse. Thus, the behavior of the circuit is that of an incremental delay line, where the AND gates select the appropriate tap corresponding to the desired number of delay increments. The shift register may be of whatever length is necessary to produce a specified maximum delay. In this application, one delay equalizer shift register is required for each channel.

Figure 8:
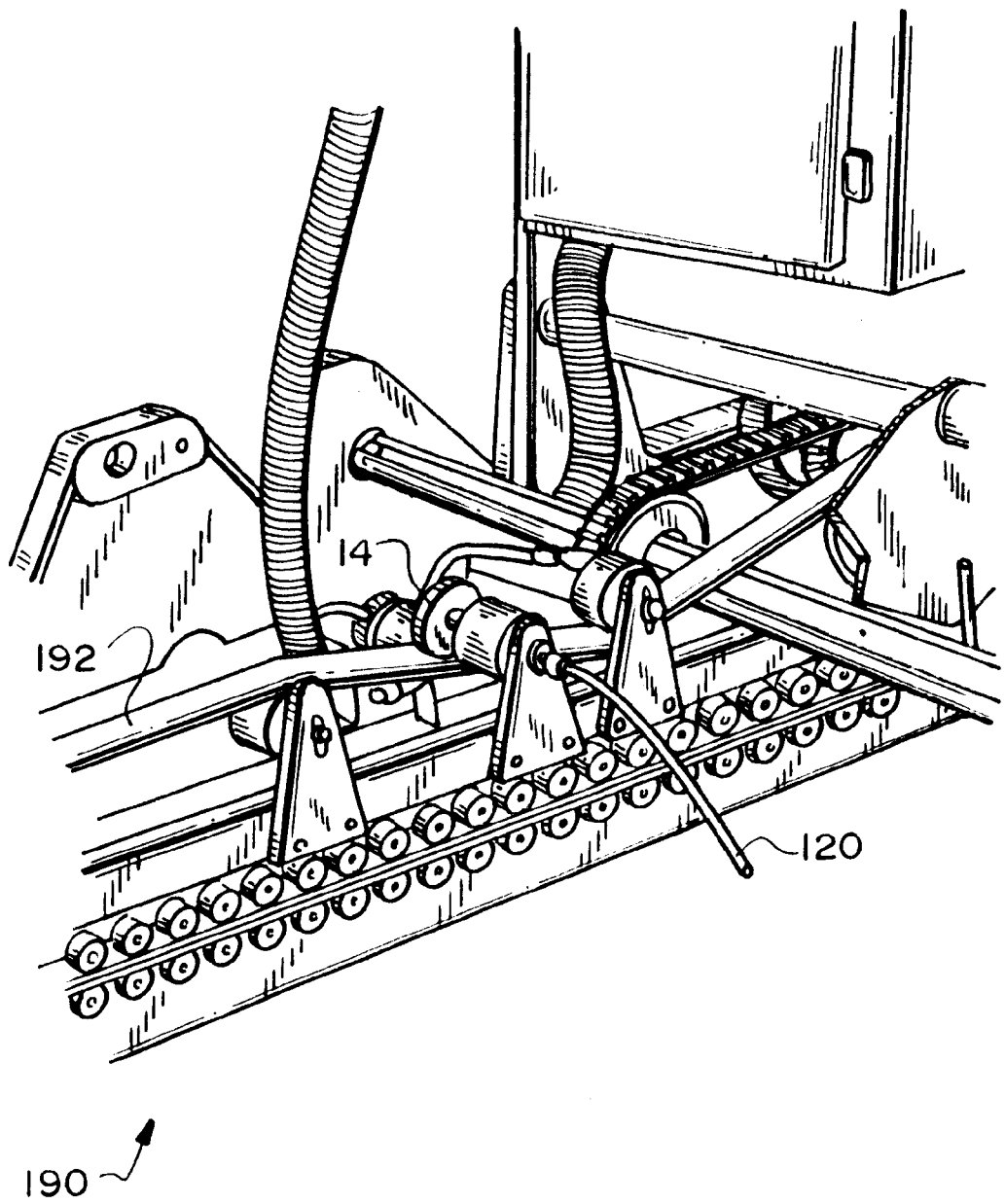
FIG. 8 is a perspective view of a section of a paper box folding and sealing machine showing the positioning of a line tachometer 14 on the machine in contact with a conveyor belt 192.

Referring to FIG. 8, a perspective view is shown of a section of the paper box folding and sealing machine 190 where the line tachometer 14 is positioned in contact with the belt 182 of the conveyor 29. A line tachometer cable 120 extends from the tachometer 14 to the control panel 98. The line tachometer 14 is positioned to measure a conveyor travel distance by providing a digital signal to the system controller 16. FIG. 8 shows the location of the line tachometer 14 on the machine 190. It is mounted by a bracket to the side of the machine 190 such that one end of the tachometer 14 contacts a conveyor belt 192 thereby measuring the speed of the conveyor belt 192 and the distance travelled. The line tachometer 14 may be embodied by Part No. C373373 manufactured by Danaher Controls, of Gurnee, Ill.

The system controller 14 provides sample/run routing control. It may be embodied by specially programmed EPLD manufactured by Altera Corporation, of San Jose, Calif., which are incorporated in microelectronic chips 162, 172 and 186.

The memory 18 stores a synthetic image based on signals from the 8 channel sensor 12 and provides such image to the processor 20 when requested by the system controller 16. The memory for storing such image is an 8K words by 8 bits static random access memory (SRAM).

Figure 9:
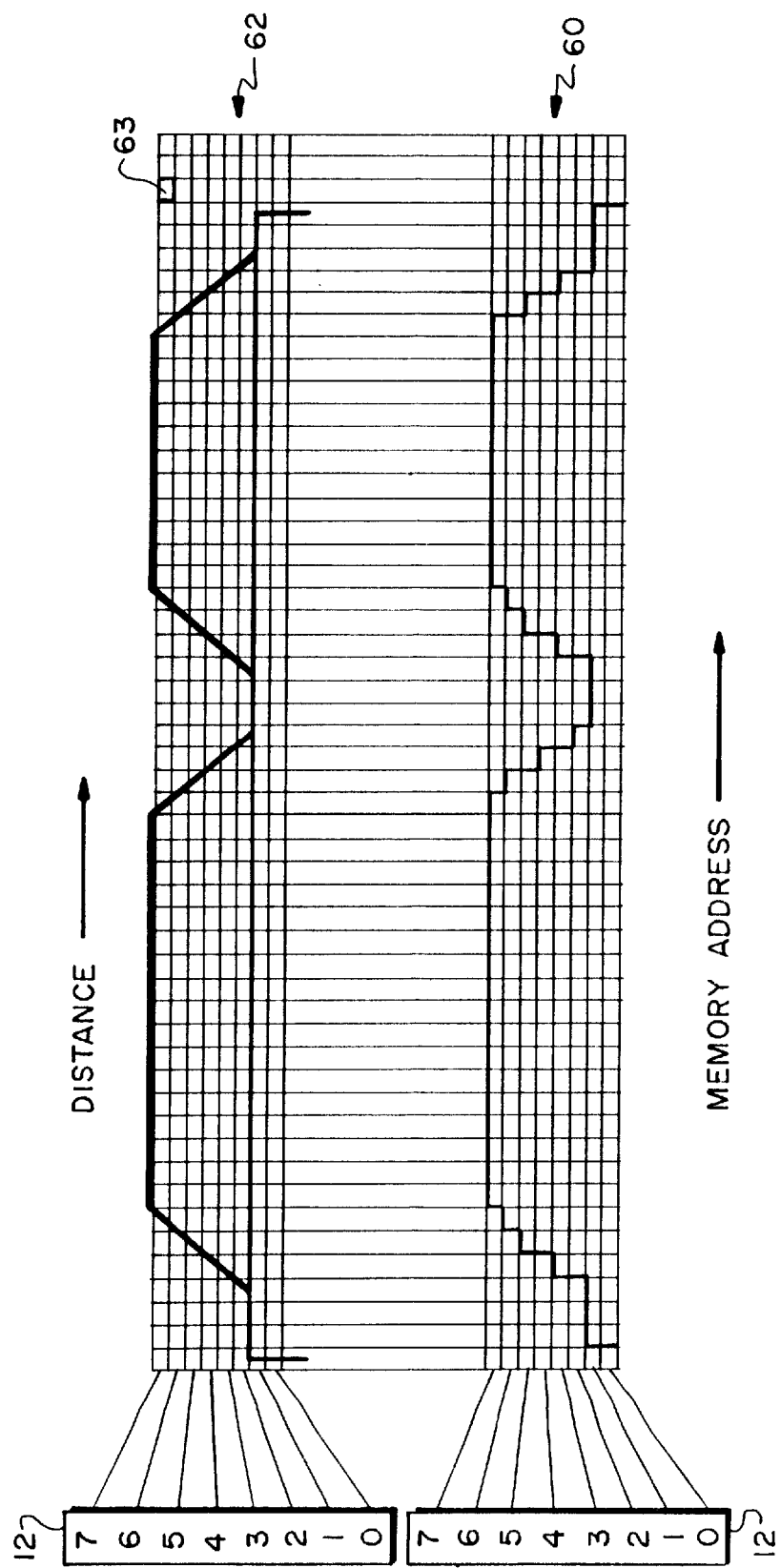
FIG. 9 shows in graph 60 a sample of a synthetic image stored in memory and in graph 62 a contour of the carton under test.
Figure 10:
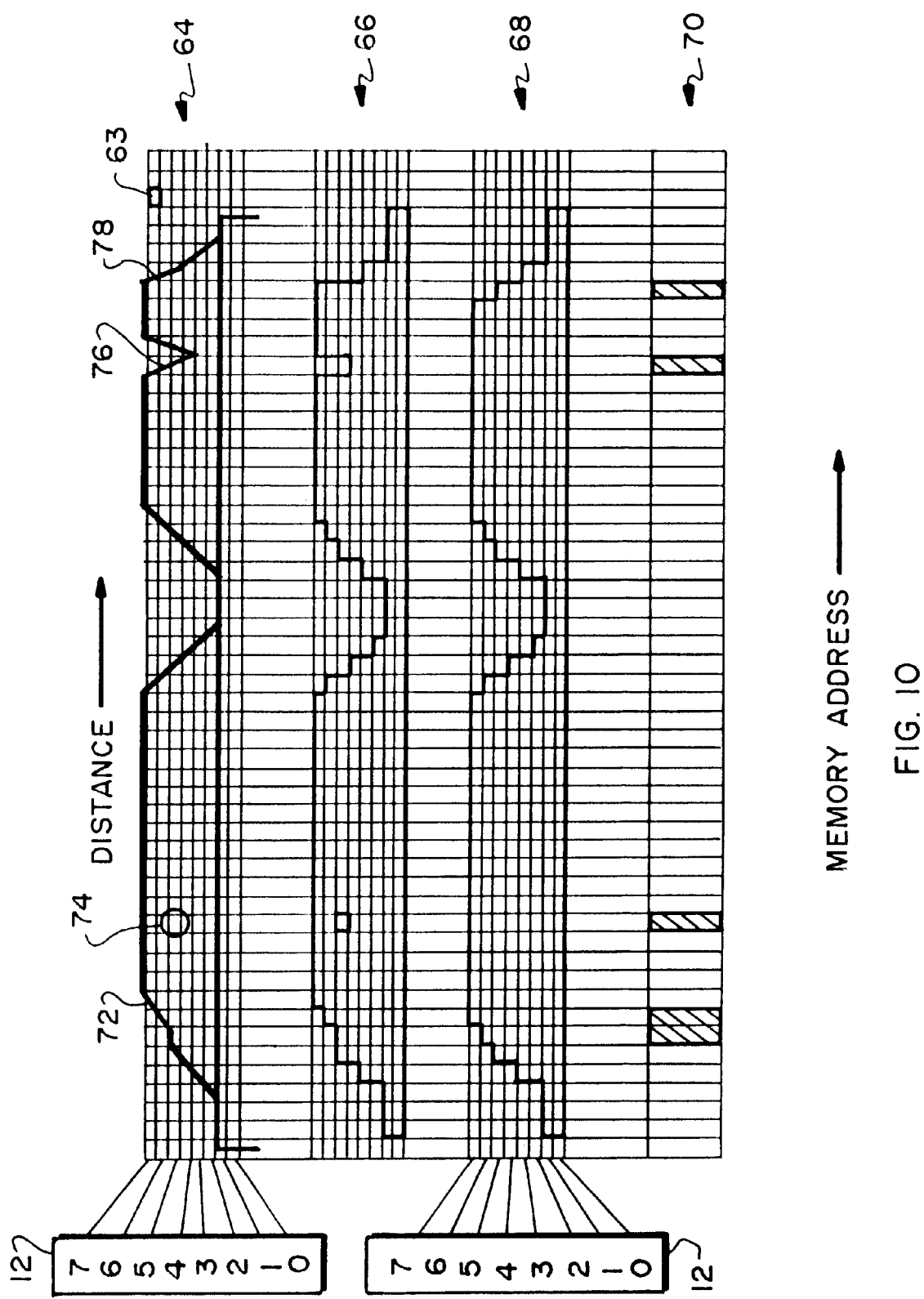
FIG. 10 shows in graph 68 a stored synthetic image of a good carton, in graph 66 a real time synthetic image of a carton under test, in graph 64 a contour of the carton under test and in group 70 error output signals.

Referring now to FIG. 2, FIG. 9 and FIG. 10, the processor 20 receives data from the memory 18 representing the stored synthetic image of a good carton as illustrated in the lower graph 60 of FIG. 9. The upper graph 62 represents a contour of the carton under test. Each of the squares in FIG. 9 and FIG. 10 represent a resolution cell 63, and each cell 63 represents a bit of information from the sensor 12. Referring to FIG. 10, the processor 20 also receives a real time image from the carton being tested as illustrated by graph 66. The contour of this image showing the defects detected is shown in graph 64. The wavy leading edge 72 represents a tear, the circle 74 indicates a pinhole, the "V" 76 indicates a tear, and the trailing edge 78 sudden drop represents a bad cut in a carton. Graph 70 represents error outputs from the processor 20. The processor 20 performs a cell by cell comparison of the real time image of a good carton (graph 66) versus the stored synthetic image (graph 68) resulting in any faults or defects in the carton being detected and error output signals illustrated in graph 70 provided to the output switch and display 22.

An optional ejector 24 may be provided for the purpose of removing faulty cartons from the production stream. When the synthetic imaging apparatus 10 locates a faulty carton it sends a pulse to a distance driven delay circuit which is tapped to provide a pulse to the ejector at the exact moment that the box is passing through the ejector. When the ejector receives the pulse, it activates, grips the box, pulls it from the production stream sending it into a box or cage provided for the purpose of receiving rejected boxes. If an ejector is not used, the feed of the machine is stopped, and the apparatus inspects all remaining boxes on the machine, storing the locations of all faulty boxes in a special memory. This memory can then be interrogated and the indicated boxes removed manually.

Figure 11:
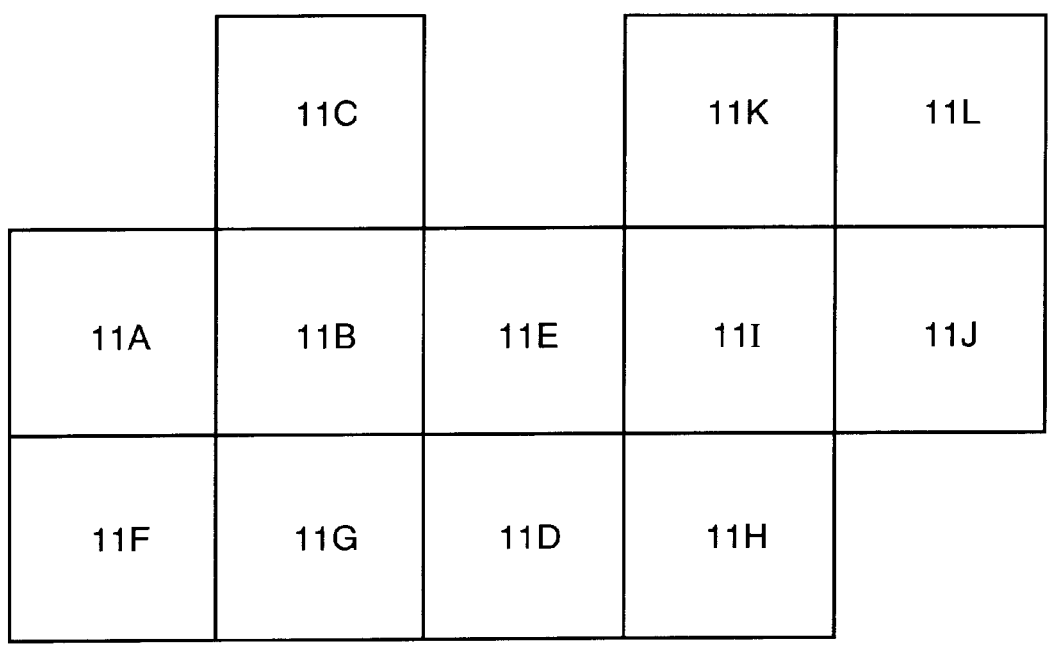
FIG. 11 shows an arrangement for viewing FIGS. 11A to 11L.
Figure 11B:
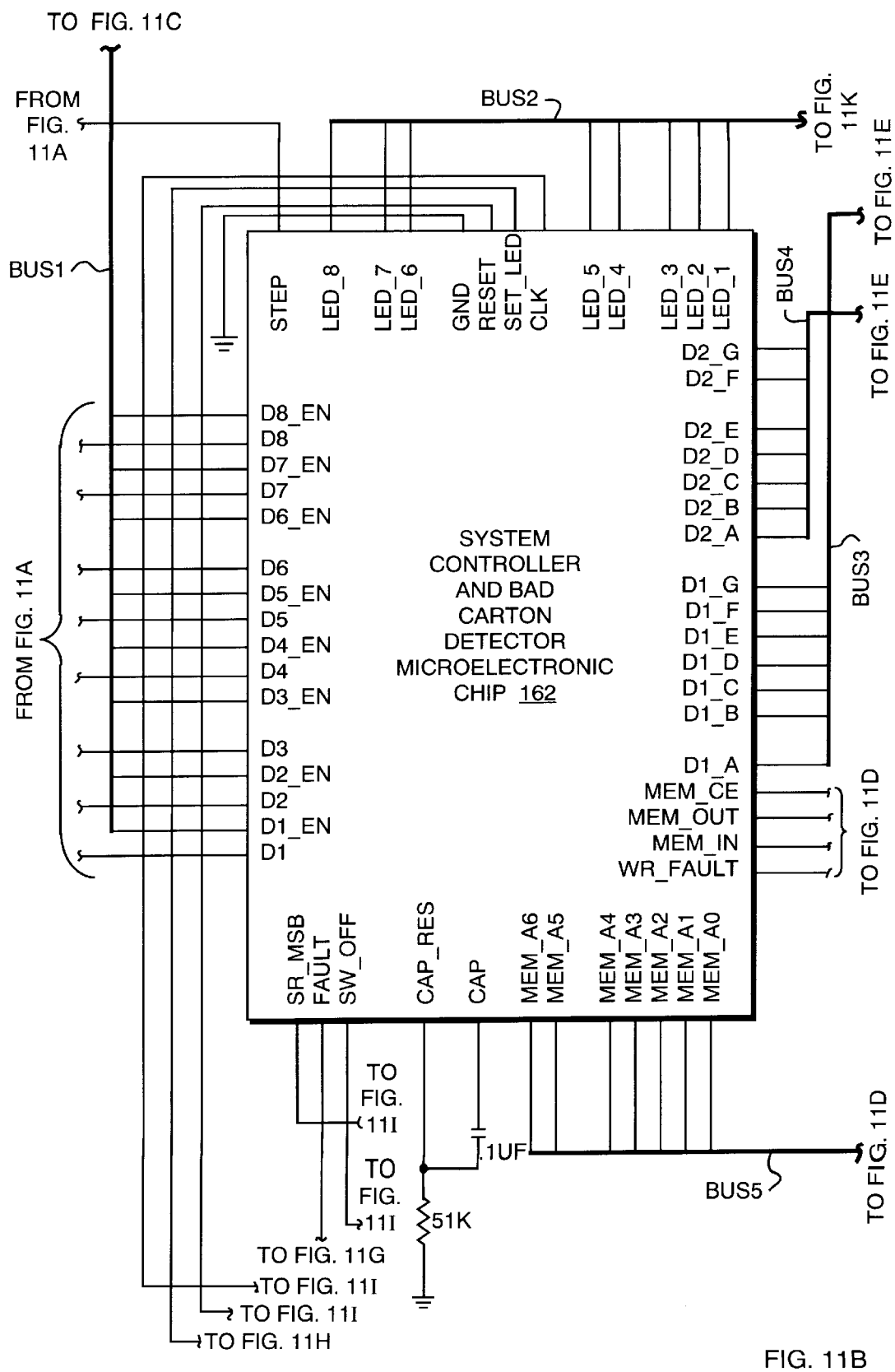
Figure 11D:
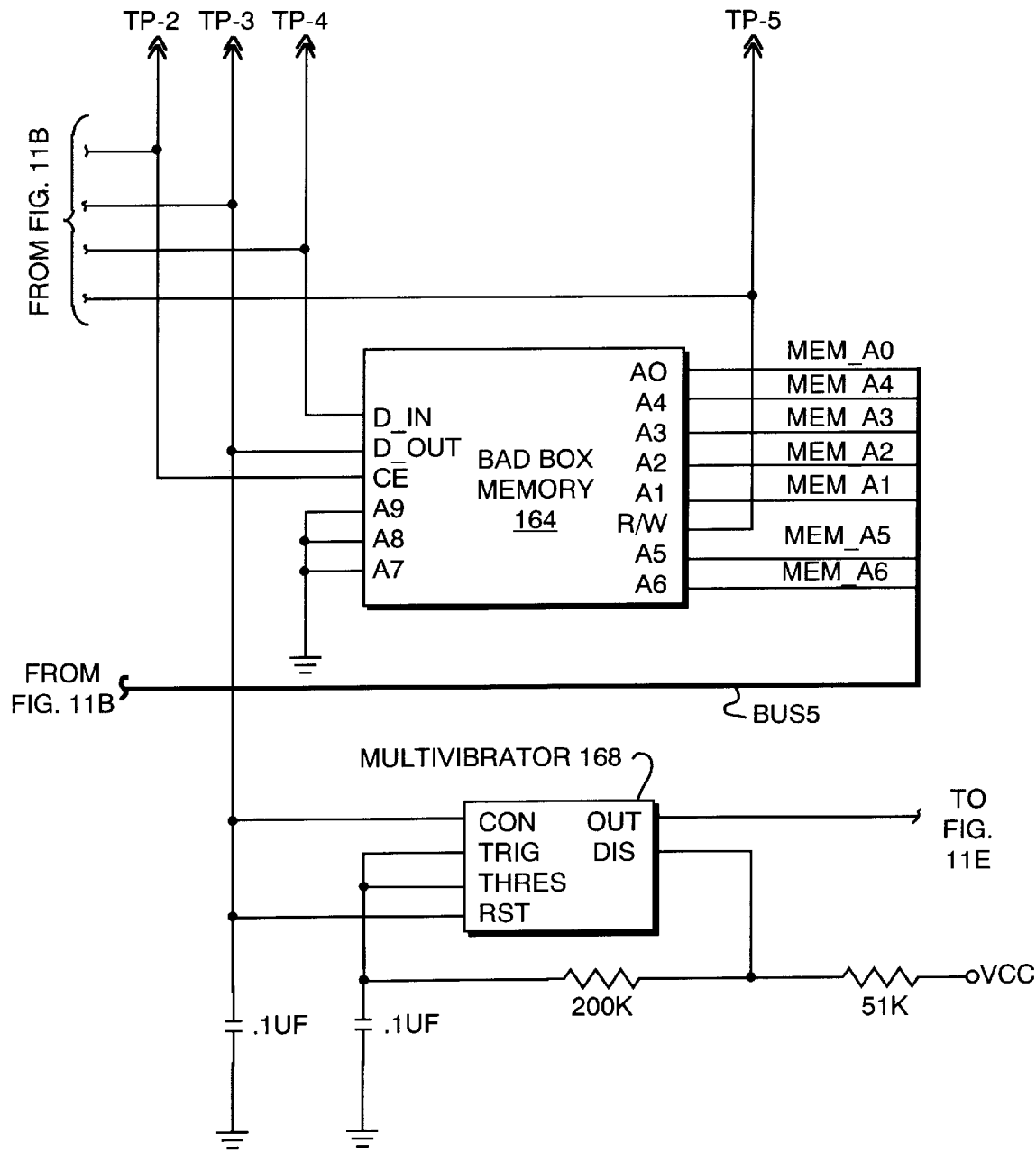
Figure 11E:
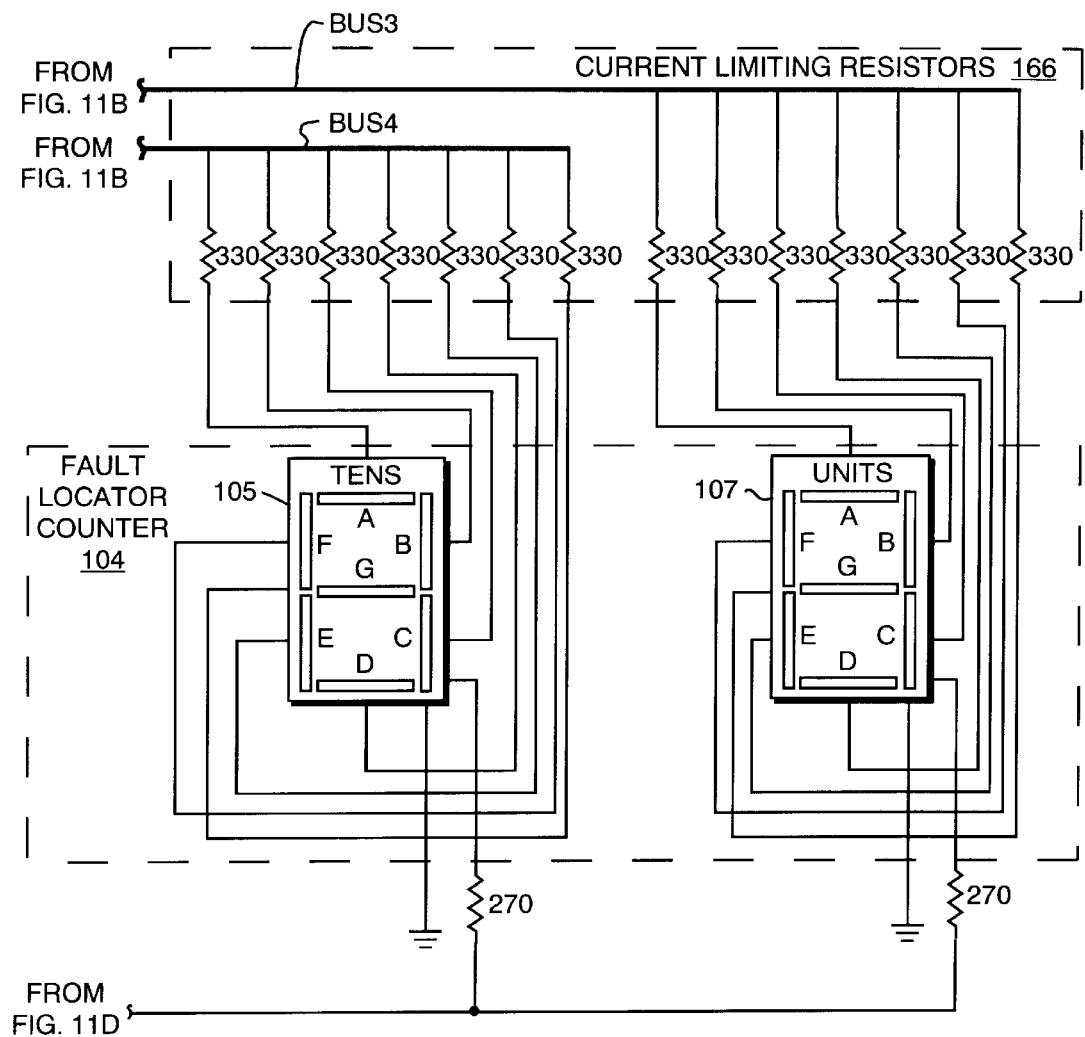

Referring now to FIG. 11, FIGS. 11A to 11L, and FIG. 12, FIG. 11 shows an arrangement for FIGS. 11A to 11L for use with the following description. FIGS. 11A to 11L in combination are a schematic and block diagram of the synthetic image processing inspection apparatus 10 showing the electronic implementation of the system block diagram of FIG. 2. In FIGS. 11A to 11L, groups of data or signal lines connecting between electronic components shown in the figures are referred to as BUS 1 to BUS 8. FIG. 12 is a pictorial view of a control panel 98 and housing for the electronics shown in FIG. 11A to 11L.

Figure 11F:
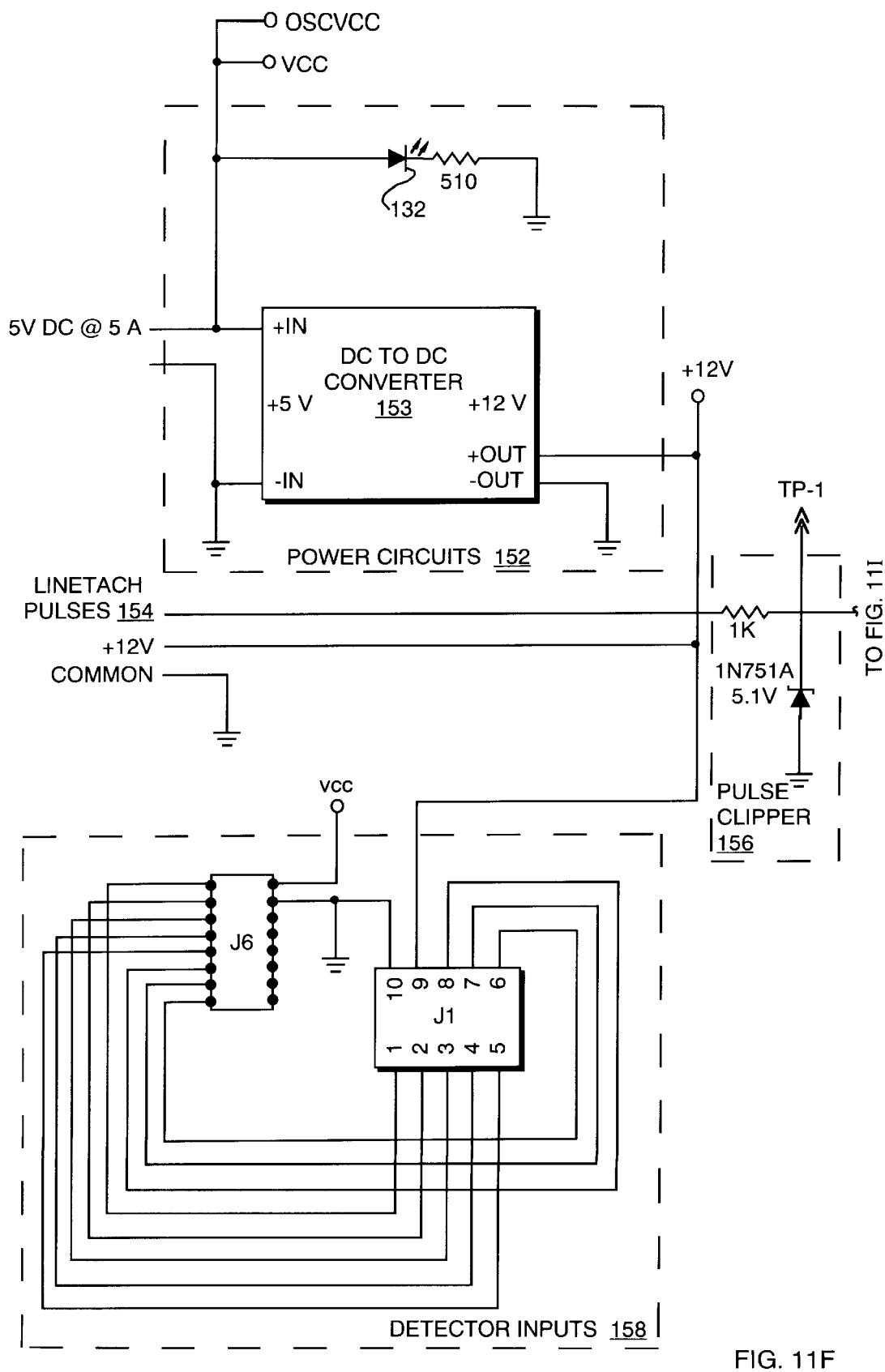
Figure 12:
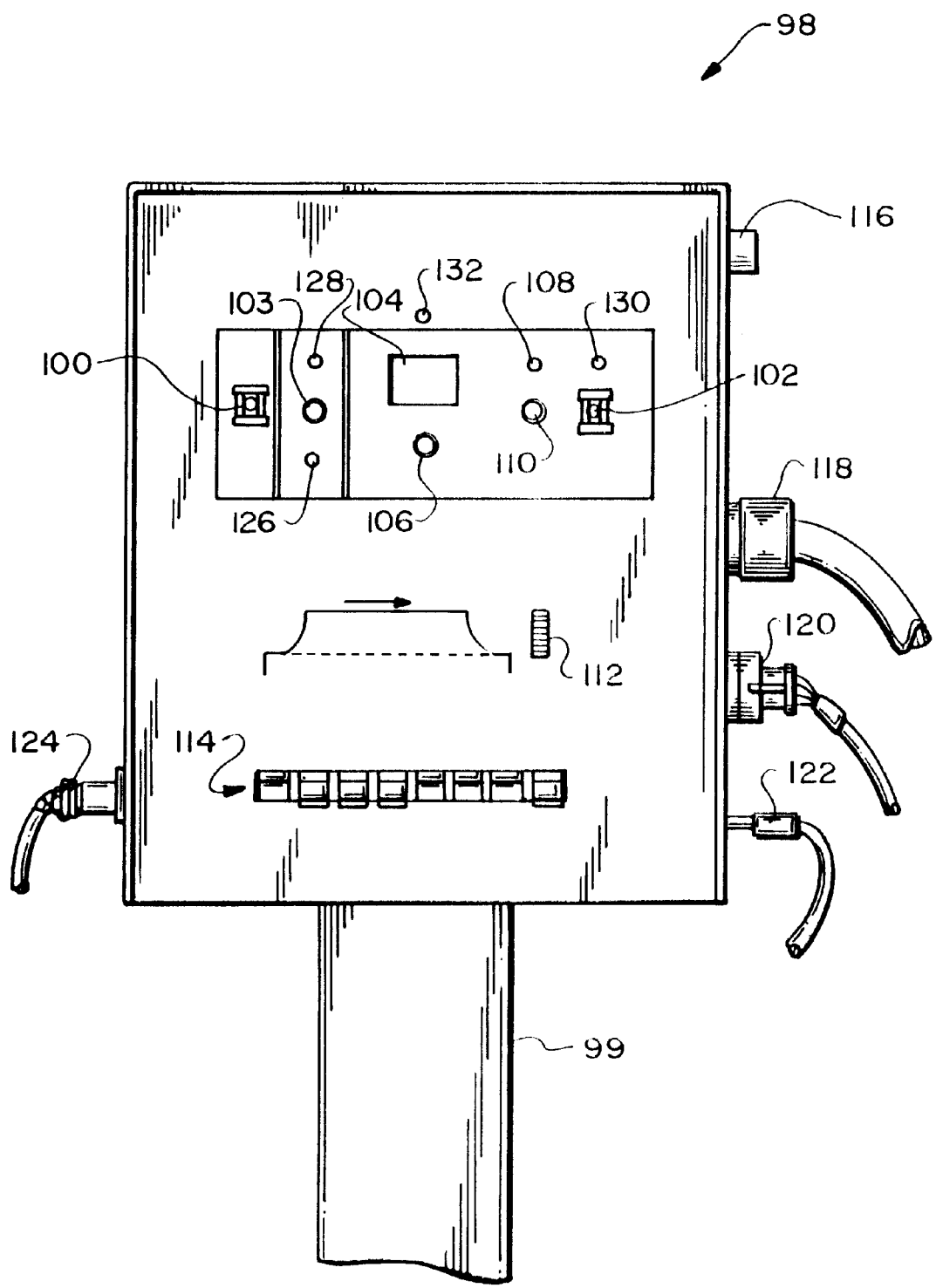
FIG. 12 is a pictorial view of a control panel and housing for the circuitry shown in FIGS. 11A to 11L.

Referring to FIGS. 11A and 11F, detector inputs 158 for the 8-channel sensor 12 receive their VCC and +12 via connectors J6 and J1 respectively. The detector outputs from the 8-channel sensor 12 are provided via the connector J2 to pull-up resistors 150 and are connected to a first portion of the system controller 16 which is implemented in the microelectronic chip 162. A line tachometer input 154 is received from the line tachometer 14 and it is fed to phase clipper 156 and then to a second portion of the system controller which is implemented in the microelectronic chip 172. The line tachometer input 154 serves as a timing pulse for sampling the outputs of the 8-channel sensor 12 in order to form an image of the area of the box or carton blanks 30 being inspected. By sampling the sensor 12 data with the line tachometer input 154, the sampling rate is proportional to the speed of the conveyor 29 resulting in each timing pulse representing a single increment of distance travelled by the conveyor 29. Therefore, the resulting image data is proportional to the actual size of the box or carton blank 30 being inspected and independent of the conveyor 29 speed. Power circuits 152 are provided for converting a +5 DC input via a DC/DC converter 153 to a +12 volt DC output. A light emitting diode (LED) power light 132 indicates when the power is on.

Figure 11G:
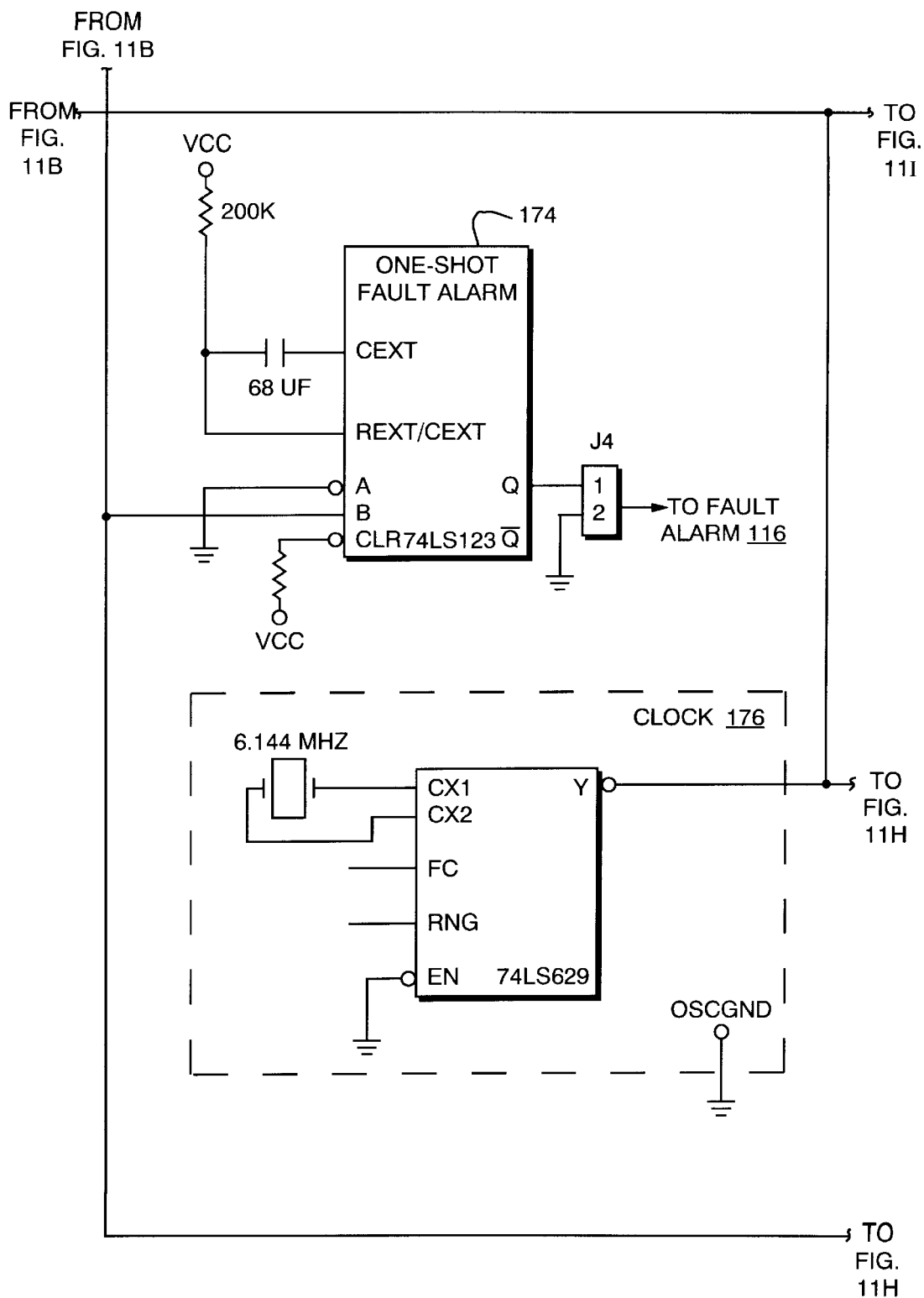
Figure 11H:
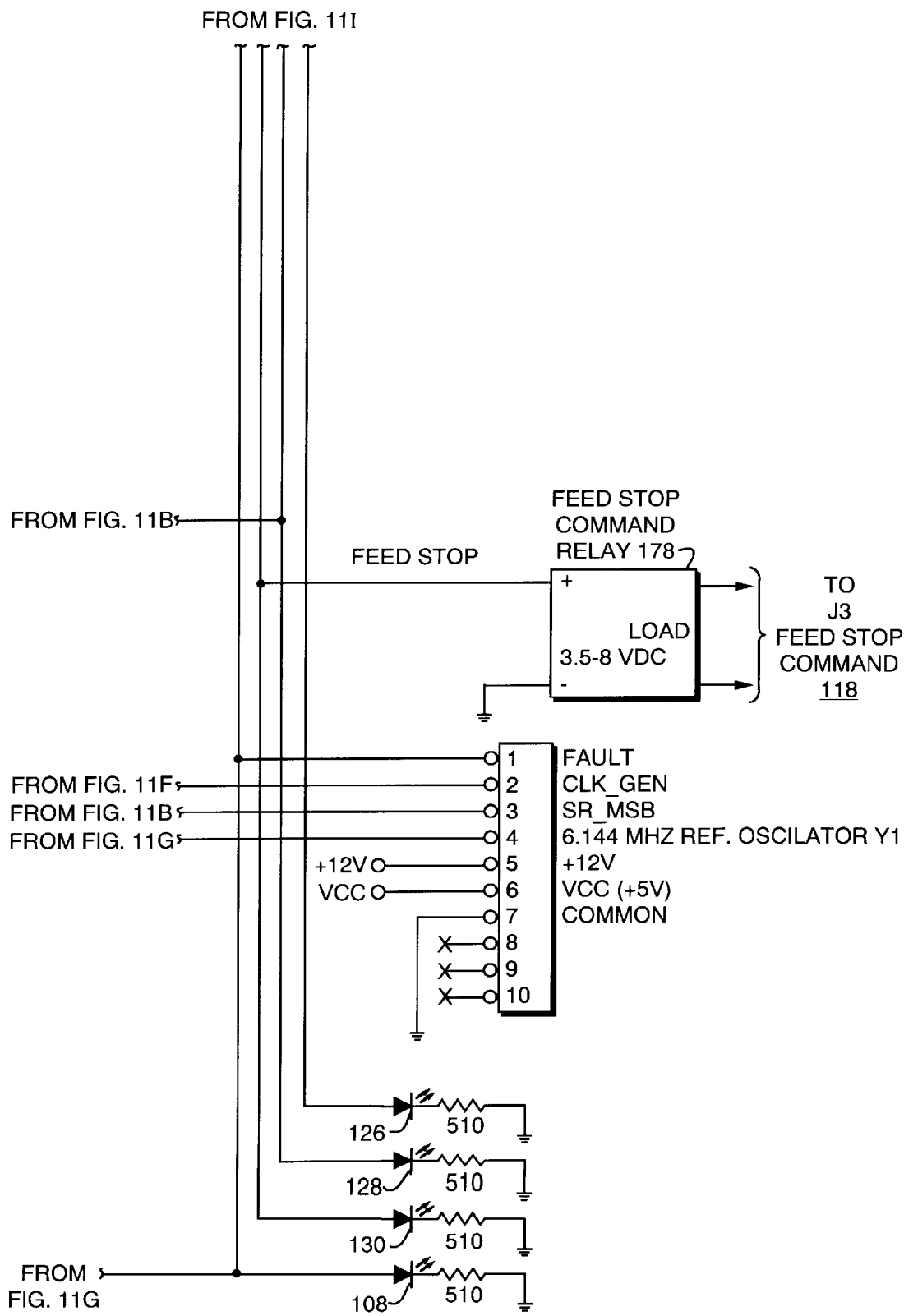
Figure 11I:
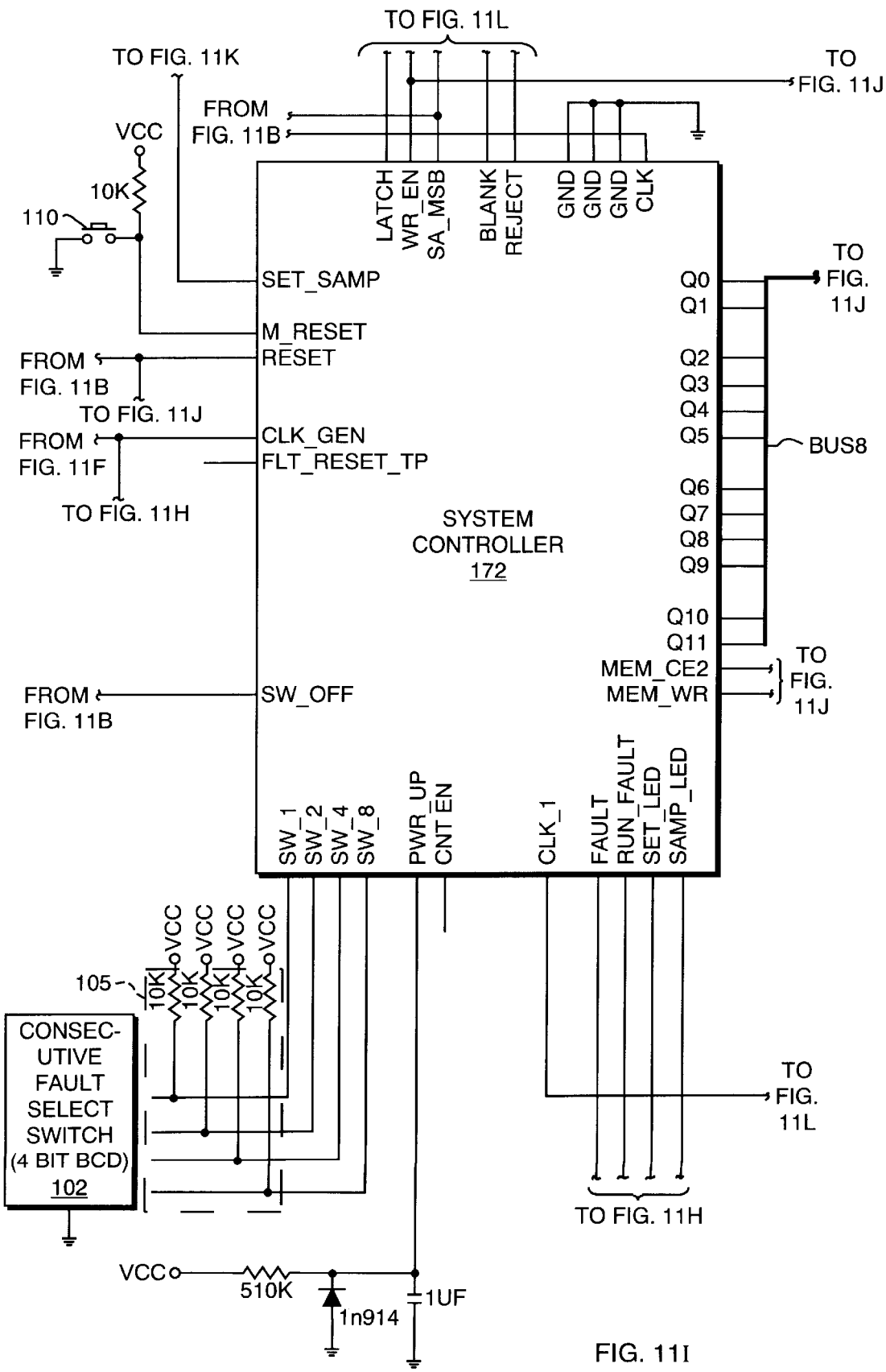
Figure 11J:
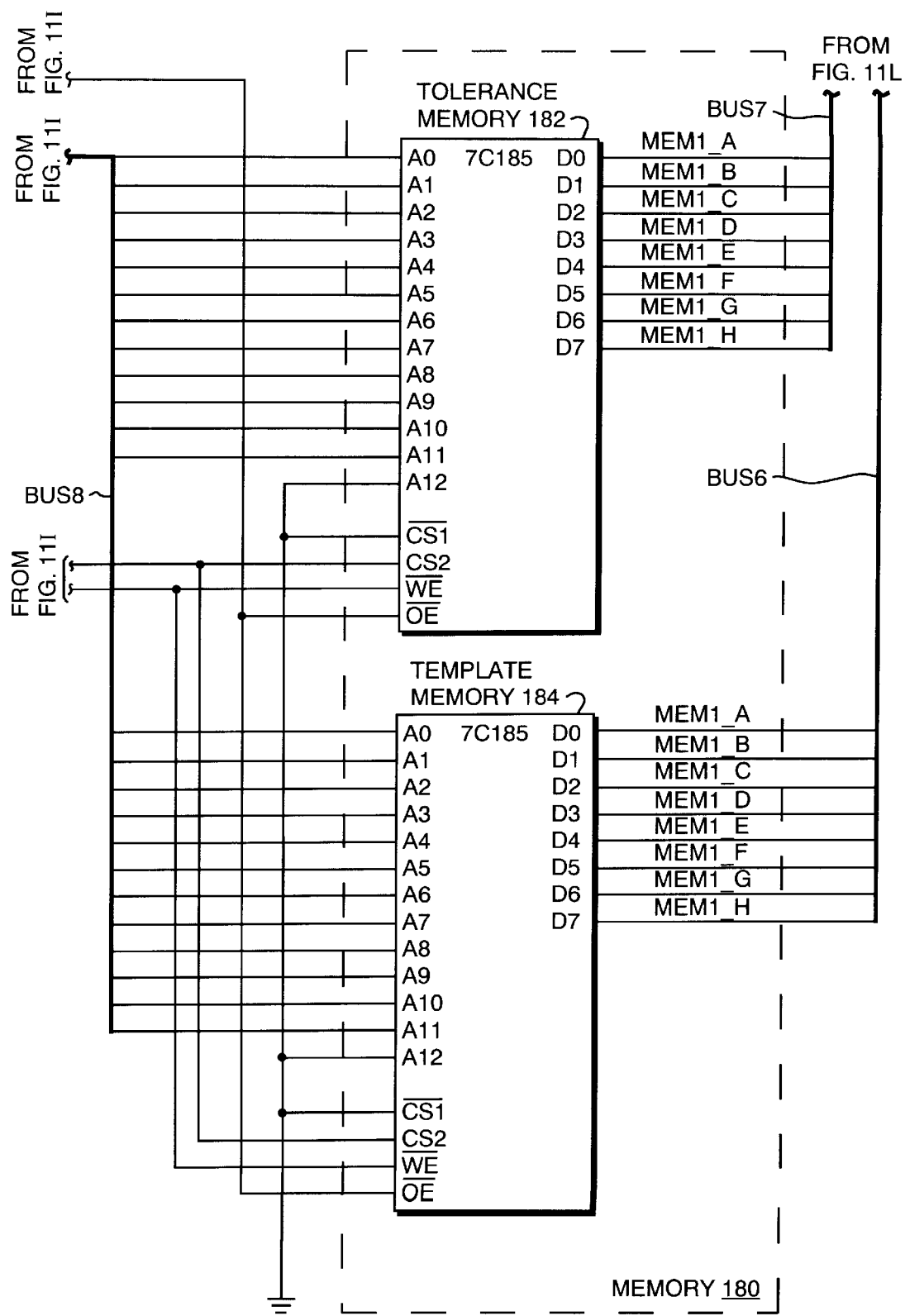
Figure 11L:
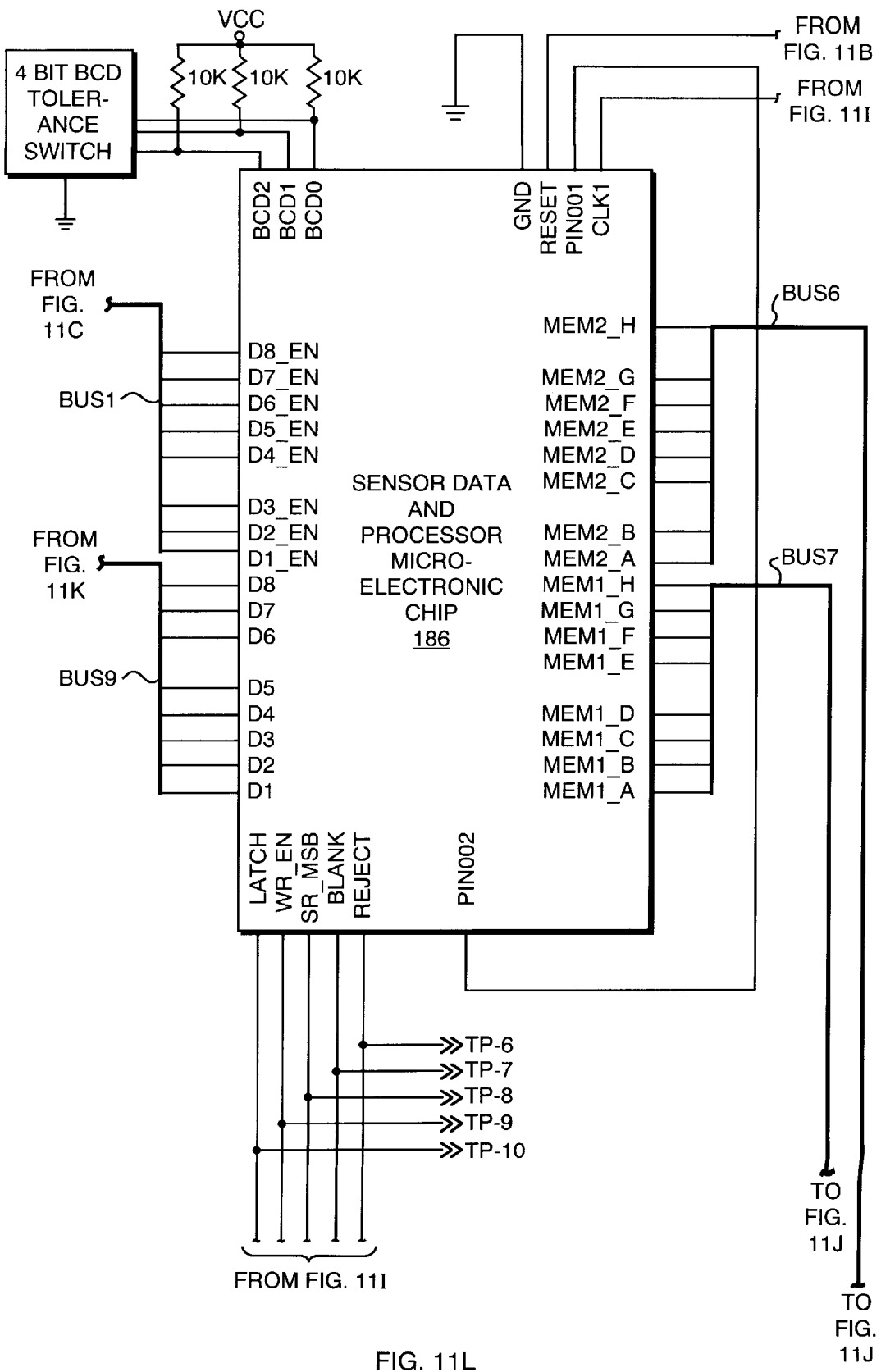

Referring to FIG. 11C, eight sensor selector switches 114 each connected to one of the eight pull-up resistors 115, to the first portion of the system controller 16 in microelectronic chip 162 (FIG. 11B) and to processor 20 located in microelectronic chip 186 (FIG. 11L). The sensor selector switches 114 are set by an operator and select how many channels from the 8-channel sensor 12 will be processed. Eight lights 112 (FIG. 11K) indicate the number of channel sensors actually in use during a particular run of carton blanks, and they are connected to microelectronic chip 162 and microelectronic chip 186.

Referring now to FIGS. 11D and 11E, two numeric displays 105, 107 referred to as the fault locator counter 104 identifies a faulty box along the conveyor 29 line. They are connected through current limiting resistors 166 to the bad carton circuits in microelectronic chip 162 (FIG. 11B). A decimal point of the fault locator counter 104 flashes to indicate a bad box or carton. The multivibrator 168 receives a trigger signal from the bad carton detector circuits in microelectronic chip 162. A bad box memory 164 is connected to the bad carton detector circuits in microelectronic chip 162, and it remembers which bad cartons are detected. A bad box advance push button switch 106 (FIG. 11A) starts the fault location counter 104 to locate one or more bad boxes after a feed stop command 118 (FIG. 11H) is generated.

Referring to FIGS. 11I and 11M, a debouncer circuit 160 is coupled to the switch 106. A consecutive fault switch 102 coupled to pull-up resistors 105 determines how many faults are to be allowed to occur before a feed stop signal is generated. The consecutive fault switch outputs are fed to the second portion of the system controller in microelectronic chip 172. Indicator lights shown in FIG. 11H controlled by the system controller 16 in microelectronic chip 172 include a set-up light 128 and a sample light 126. When a set-up push button switch 103 (FIG. 11K) is pushed the first time, the set-up light 128 turns-on, and when a box or carton 30 is inserted under the sensor 12, the sensor selector switches 114 (FIG. 11C) are set-up to cover the width of the box 30 to be tested. When the set-up push button switch 103 is pushed a second time, after the box 30 is removed from the sensor 12, the sample light 126 turns-on; the box 30 is then passed through the sensor 12 and a synthetic image such as illustrated in graph 68 of FIG. 10 is stored in memory 184 (FIG. 11J).

Other indicator lights shown in FIG. 11H include a feed stop light 130 which indicates that the feed has stopped, and a fault light 108 which indicates a fault has occurred. The feed stop signal from the system controller 16 in microelectronic chip 172 that turns on the feed stop light 130 is fed to a feed stop command relay 178 which provides a feed stop command 118 signal to the machine 190 via the J3 connector and cable 118. A reset faults push button switch 110 (FIG. 11I) is connected to microelectronic chip 172 and causes all bad carton detector circuits to be reset in microelectronic chips 162 and 172.

Referring to FIG. 11K, the set-up push button switch 103 described above selects the portion of a carton blank to be sampled. A debouncer circuit 170 is connected to switch 103 and the switch 103 output is fed to the system controller in microelectronic chip 172.

Referring to FIG. 11G, a one-shot circuit 174 is triggered by the bad carton detector circuits in microelectronic chip 162 and the output of the one-shot circuit 174 generates a signal via connector J4 and turns-on a fault alarm 116 located on the side of the control panel 98. A 6.144 MHZ clock generator 176 provides a clock signal for the circuitry implementing the synthetic image processing inspection apparatus 10.

Referring now to FIG. 11J, the memory 18 comprises a tolerance memory 182 and a template memory 184. Each of the memories are 8K×8 bits. The template memory 184 stores the digital image of a carton blank with no defects. The tolerance memory 182 provides for tolerances when the stored template is compared to a carton blank under test. The determination of such tolerances is described hereinafter. The memory data is provided to the processor 20 in microelectronic chip 186 where the comparison is made between stored image data of a good carton blank to the real time image data being received for the carton blank under test. The addresses for memory 18 are generated by the system controller 16 in microelectronic chip 172 and each address addresses a memory location in the tolerance memory 182 and the template memory 184; each memory output data word comprises a description of the stored template along with tolerance data which is interpreted by the processor 20 in microelectronic chip 186 and a decision made as to whether the data being received for the carton blank under test is within the tolerance for the good carton blank. When the tolerances are exceeded, the processor 20 generates error signals as shown in graph 20 of FIG. 10.

The microelectronic chips 162, 172, and 186 are custom designed chips which may be embodied by microelectronic chips manufactured by International Paper Box Machine Company, Inc. of Nashua, N.H. having part numbers WALD-DPY, WALD-CRL and WALDORF1 respectively. The processor 20 which is included in microelectronic chip 186 may be embodied by specially programmed Series 7000 or Series 9000 (EPLD) manufactured by Altera Corporation, of San Jose, Calif. The tolerance memory 182 and the template memory 184 may be embodied by 64K bit CMOS SRAM, model number ATT7C185 manufactured by AT&T Microelectronics of Allentown, Pa. 18103 or other similar SRAM.

On the side of the control panel 98 housing are connectors for four cables which are an AC power cable 124, feed stop cable 118, line tach cable 120 and array sensor cable 122. The fault alarm 116 is also located on the side of the control panel 98 housing.

This concludes the description of the preferred embodiment. However, many modifications and alterations will be obvious to one of ordinary skill in the art without departing from the spirit and scope of the inventive concept. Therefore, the intent of the appended claims to cover all such variations and modifications as come within the true spirit and scope of this invention. It is intended that the scope of this invention be limited only by the appended claims.

What is claimed as new and desired to be secured by Letters Patent of the United States is:

1. In a paper box folding machine for forming individually and successively planar carton blanks into folded cartons, said machine including conveyor means for transporting successively spaced blanks along a paper line axis, said machine apparatus having an inspection zone with apparatus comprising:

means for sensing carton blanks moving transverse to a row of said sensing means on said conveyor means;

means coupled to said sensing means for sampling the outputs of said sensing means in synchronism with a timing pulse, said sampled outputs forming a synthesized image of said carton blanks;

means coupled to said sensing means for controlling the transfer of said outputs of said sensing means;

means coupled to said controlling means for storing said sensing means outputs forming said image of said carton blanks; and means coupled to said controlling means and said storing means for processing said outputs of said sensing means by comparing said outputs representing real time image data to previously stored outputs representing image data of a good carton blank to detect any defects in said one of said carton blanks providing said real time image data.

2. The apparatus as recited in claim 1 wherein said sensing means comprises an array of infrared transmitters positioned opposite infrared receivers.

3. The appartus as recited in claim 1 wherein said sensing means comprises an adjustable upper area means for receiving said carton blanks of varying thickness.

4. The apparatus as recited in claim 1 wherein said sampling of the outputs of said sensing means in synchronism with said timing pulse is performed at a rate proportional to the speed of said conveyor means, each timing pulse representing a single increment of distance travelled by said conveyor means.

5. The apparatus as recited in claim 4 wherein said conveyor means travel distance measurement enables the acquisition of said image data proportional to the actual size of carton blanks measured, independent of said conveyor means speed.

6. The apparatus as recited in claim 1 wherein said apparatus comprises a line tachometer means for providing said timing pulse.

7. The apparatus as recited in claim 1 wherein said storing means comprises a static or dynamic random access memory.

8. The apparatus as recited in claim 1 wherein said sensing means comprises:

a plurality of sensors arranged in said row adjacent to each other and transverse to the direction of travel of said conveyor means;

means for measuring the distance traveled by said conveyor means; and means coupled to each of said plurality of sensors for equalizing in time outputs from said sensing means.

9. In a paper box folding machine for forming individually and successively planar carton blanks into folded cartons, said machine including conveyor means for transporting successively spaced blanks along a paper line axis, said machine apparatus having an inspection zone with apparatus comprising:

means for sensing carton blanks moving transverse to a row of said sensing means on said conveyor means;

means coupled to said sensing means for sampling the outputs of said sensing means in synchronism with a timing pulse, said sampled outputs forming a synthesized image of said carton blanks;

means coupled to said sensing means for controlling the transfer of said outputs of said sensing means;

means coupled to said controlling means for storing said sensing means outputs forming said synthesized image of said carton blanks;

means coupled to said controlling means and said storing means for processing said outputs of said sensing means by comparing said outputs representing real time image data to previously stored outputs, representing image data of a good carton blank to detect any defects in said one of said carton blanks providing said real time image data; and means coupled to said controlling means for generating a signal to stop the feeding of said carton blanks into said machine when a bad carton blank is detected by said processing means.

10. The apparatus as recited in claim 9 wherein said sensing means comprises an array of infrared transmitters positioned opposite infrared receivers.

11. The apparatus as recited in claim 9 wherein said sensing means comprises an adjustable upper area means for receiving said carton blanks of varying thickness.

12. The apparatus as recited in claim 9 wherein said sampling of the outputs of said sensing means in synchronism with said timing pulse is performed at a rate proportional to the speed of said conveyor means, each timing pulse representing a single increment of distance travelled by said conveyor means.

13. The apparatus as recited in claim 12 wherein said conveyor means travel distance measurement enables the acquisition of said image data proportional to the actual size of said carton blanks measured, independent of said conveyor means speed.

14. The apparatus as recited in claim 9 wherein said apparatus comprises a line tachometer means for providing said timing pulse.

15. The apparatus as recited in claim 9 wherein said storing means comprises a static or dynamic random access memory.

16. The apparatus as recited in claim 9 wherein said controlling means comprises means for identifying the bad carton blanks following said stopping of said carton blank feed.

17. The apparatus as recited in claim 16 wherein said apparatus comprises a control and display panel for displaying an identifying number for each bad carton blank following said stopping of said carton blank feed.

18. The apparatus as recited in claim 9 wherein said sensing means comprises:
- a plurality of sensors arranged in said row adjacent to each other and transverse to the direction of travel of said conveyor means;
- means for measuring the distance traveled by said conveyor means; and
- means coupled to each of said plurality of sensors for equalizing in time outputs from said sensing means.

19. An apparatus for detecting defects in a carton blank moving on a conveyor comprising:
- infrared means for sensing a carton blank moving transverse to a row of said sensing means on said conveyor;
- means coupled to said infrared sensing means for sampling the outputs of said sensing means in synchronism with a timing pulse at a rate proportional to the speed of said conveyor to form a synthesized image of said carton blank;
- means coupled to said infrared sensing means for controlling the transfer of said outputs of said infrared sensing means;
- means coupled to said controlling means for storing said sampled outputs of said infrared sensing means;
- means coupled to said controlling means and said memory means for processing real time image data of said carton blank and comparing said real time image data to previously stored image data of a good carton blank to detect any defects in said carton blank being tested;
- means coupled to said controlling means for generating a signal to stop the feeding of carton blanks into said apparatus when a bad carton blank is detected by said processing means; and
- means coupled to said controlling means for identifying said bad carton blanks following the stopping of said carton feed.

20. The apparatus as recited in claim 19 wherein said apparatus comprises a line tachometer means for providing said timing pulse.

21. The apparatus as recited in claim 19 wherein said apparatus comprises a control end display panel for displaying an identifying number for each bad carton blank following said stopping of said carton blank feed.

22. The apparatus as recited in claim 19 wherein said infrared sensing means comprises an adjustable upper arm means for receiving said carton blanks of varying thickness.

23. A method for inspecting box blanks in a paper box folding machine for forming individually and successively planar blanks into folded boxes, said machine including conveyor means for transporting successively spaced blanks along a paper line axis, comprising the steps of:
- sensing box blanks moving transverse to a row of said sensing means on said conveyor means;
- sampling the outputs of said sensing means in synchronism with a timing pulse, said sampled outputs forming a synthesized image of said box blanks;
- controlling the transfer of said outputs of said sensing means;
- storing said sensing means outputs forming said synthesized image of said box blanks with means coupled to said controlling means; and
- processing said outputs of said sensing means by comparing said outputs representing real time image data to previously stored outputs representing image data of a good box blank to detect any defects in said one of said box blanks providing said real time image data with means coupled to said controlling means and said storing means.

24. The method as recited in claim 23 wherein said step of sampling of the outputs of said sensing means comprises the step of performing said sampling in synchronism with said timing pulse at a rate proportional to the speed of said conveyor means, each timing pulse representing a single increment of distance travelled by said conveyor means.

25. The method as recited in claim 23 wherein said method further comprises the step of generating a signal to stop the feeding of said box blanks with said machine when a bad box blank is detected by said processing means.

26. The method as recited in claim 23 wherein said method comprises the step of displaying an identifying number for each bad box blank following the stopping of said bad box feed.

27. A method for detecting defects in a carton blank moving on a conveyer comprising the steps of:
- sensing a carton blank moving transverse to a row of said sensing means on said conveyor with infrared means;
- sampling the outputs of said sensing means in synchronism with a timing pulse at a rate proportional to the speed of said conveyor to form a synthesized image of said carton blank;
- controlling the transfer of said outputs of said infrared sensing means with means coupled to said infrared sensing means;

storing said sampled outputs of said infrared sensing means with means coupled to said controlling means;

processing real time image data of said carton blank and comparing said real time image data to previously stored image data of a good carton blank to detect any defects in said carton blank being tested with means coupled to said controlling means and said memory means;

generating a signal to stop the feeding of carton blanks into said apparatus with means coupled to said controlling means when a bad carton blank is detected by said processing means; and identifying said baa carton blanks following the stopping of said carton feed with means coupled to said controlling means.

28. The method as recited in claim 27 wherein said method comprises the step of having a line tachometer means for providing said timing pulse.

29. The method as recited in claim 27 wherein said method comprises the step of providing a control and display panel for displaying an identifying number for each bad carton blank following said stopping of said carton blank feed.

30. The method as recited in claim 27 wherein said step of sensing a carton blank moving on said conveyor comprises the step of adjusting an upper arm of said infrared sensing means for sensing box blanks of varying thickness.

* * * * *